United States Patent [19]
Larsen et al.

[11] Patent Number: 5,632,235
[45] Date of Patent: May 27, 1997

[54] PET FLOTATION AID, WALKER AND METHOD

[76] Inventors: Kurt D. Larsen, 8 Lamborn Ave., Congers, N.Y. 10920-2008; Eric K. Larsen, 461 Storms Rd., Valley Cottage, N.Y. 10989

[21] Appl. No.: 676,942

[22] Filed: Jul. 8, 1996

Related U.S. Application Data

[63] Continuation-in-part of Ser. No. 368,856, Jan. 5, 1995.
[51] Int. Cl.$^6$ .................................................. A01K 29/00
[52] U.S. Cl. .......................... 119/856; 119/858; 119/907
[58] Field of Search ................................ 119/858, 907, 119/856

[56] References Cited

U.S. PATENT DOCUMENTS

| | | | |
|---|---|---|---|
| 4,489,677 | 12/1984 | Handley | 119/102 |
| 4,831,967 | 5/1989 | Anderson | 119/102 |
| 5,044,321 | 9/1991 | Selph | 119/96 |
| 5,149,271 | 9/1992 | Marvich | 119/856 X |

FOREIGN PATENT DOCUMENTS

| | | | |
|---|---|---|---|
| 1194738 | 10/1985 | Canada | 119/907 |
| 2157937 | 11/1985 | United Kingdom | 119/907 |

*Primary Examiner*—Gene Mancene
*Assistant Examiner*—Thomas Price
*Attorney, Agent, or Firm*—Richard L. Miller, P. E.

[57] ABSTRACT

A pet flotation aid and walker that includes a hollow and rectangular-shaped top panel that contains a piece of internal foam floatation material, hollow and trapezoidal-shaped right and left side panels that contain pieces of internal foam floatation material and are generally downwardly bendable from the hollow and rectangular-shaped top panel, trapezoidal-shaped and wide right and left belly flaps that are generally inwardly bendable from the hollow and trapezoidal-shaped right and left side panels, generally concavo-convex-shaped right and left neck flaps that contain pieces of internal foam floatation material and are generally inwardly bendable from the hollow and trapezoidal-shaped right and left side panels, neck flap attaching apparatus for releasibly attaching the generally concavo-convex-shaped right and left neck flaps to each other, a first continuous, light-reflective, and adjustable belly strap, first strap attaching apparatus for releasibly attaching the fixed proximal end and the free distal end of the first continuous, light-reflective, and adjustable belly strap to each other, a second continuous, light-reflective, and adjustable belly strap, and second strap attaching apparatus for releasibly attaching the fixed proximal end and the free distal end of the second continuous, light-reflective, and adjustable belly strap to each other.

32 Claims, 1 Drawing Sheet

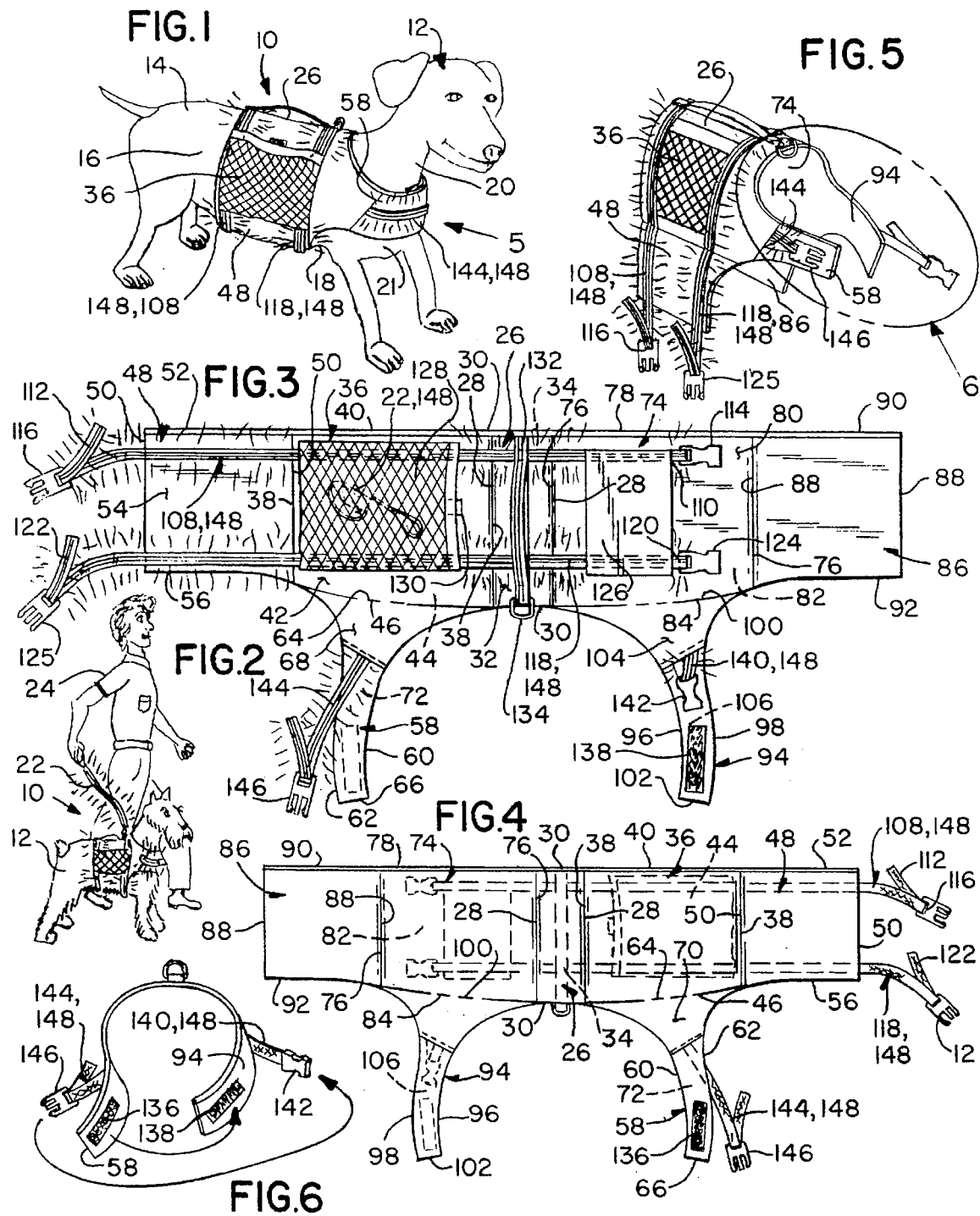

PET FLOTATION AID, WALKER AND METHOD

CROSS REFERENCES TO RELATED APPLICATIONS

The instant application is a Continuation-in-Part of co-pending application Ser. No. 08/368,856 filed on Jan. 5, 1995.

Further, the instant application contains subject matter disclosed in applicant's Disclosure Document No. 385476 filed on Nov. 14, 1995. And as such, it is respectfully requested that this Disclosure Documents be relied upon and remain a permanent part of the file history during the prosecution of the instant application and during any subsequent action thereof.

BACKGROUND OF THE INVENTION

The present invention relates to a pet flotation aid and walker. More particularly, the present invention relates to a pet flotation aid and walker that includes a hollow and rectangular-shaped top panel that contains a piece of internal foam floatation material, hollow and trapezoidal-shaped right and left side panels that contain pieces of internal foam floatation material and are generally downwardly bendable from the hollow and rectangular-shaped top panel, trapezoidal-shaped and wide right and left belly flaps that are generally inwardly bendable from the hollow and trapezoidal-shaped right and left side panels, generally concavo-convex-shaped right and left neck flaps that contain pieces of internal foam floatation material and are generally inwardly bendable from the hollow and trapezoidal-shaped right and left side panels, neck flap attaching apparatus for releasibly attaching the generally concavo-convex-shaped right and left neck flaps to each other, a first continuous, light-reflective, and adjustable belly strap, first strap attaching apparatus for releasibly attaching the fixed proximal end and the free distal end of the first continuous, light-reflective, and adjustable belly strap to each other, a second continuous, light-reflective, and adjustable belly strap, and second strap attaching apparatus for releasibly attaching the fixed proximal end and the free distal end of the second continuous, light-reflective, and adjustable belly strap to each other.

The increasing popularity of water related recreational activities has left many pet owners with a dilemma; bring the family pet along on an outing and incur the hassle and complication of safely transporting, storing and walking the pet while near water, or simply leave the pet at home alone, with friends, or in a kennel. Many persons unfortunately are forced to choose the latter option.

As a result of the huge popularity of recreational boating, many boat owners desire to bring their pets aboard their boats for a day of fun. Like young children, pets are in constant risk of falling overboard a vessel, and should ideally wear flotation devices even while aboard a vessel which is not underway but which is simply moored at its berth. While a vessel is underway, however, the risk of falling overboard is even greater. Indeed, even adults are urged to wear flotation devices while aboard a vessel which is underway. Obviously then, since the behavior is often quite unpredictable, the need for them to a wear a safety flotation device is extremely great.

Similarly, many pet owners enjoy bringing their pets along while enjoying more traditional recreational activities such as swimming at a beach or pool. The same risk of injury or drowning is present in these situations. Furthermore, in the event that a pet should fall overboard a boat or into a pool or other body of water, it is quite difficult to quickly locate the pet and retrieve it from the water. Thus, the need to supply such pets with some sort of safety flotation device which will prevent the pet from drowning as well as allow the pet owner to quickly locate and retrieve the pet is urgent.

Many pet owners, especially those of large pets, have great difficulty in transporting these pets to their vessels. Rather than taking the "family member" with them on their boat outings, they opt to leave them with friends, neighbors, or kennels because of this perceived "major" inconvenience.

When the pet owners do in fact decide to take their large pets with them, they are faced with the difficulty in attempting to move their pets to, at, or about their desired water recreation location. For example, it is often quite difficult to move a pet from a fixed dock or pier onto a boat which, in addition to bobbing up and down due to the motion of the waves, is also several feet away from the pier or dock, and can be several feet above or below the surface of such pier or dock due to the varying tides. As a result of these difficult circumstances, it is often required that a pet be lifted aboard or lowered down on to a floating vessel. Such a task not only jeopardizes the safety of the pet, but is quite difficult to maneuver successfully. The need for an apparatus which allows for the easy lateral and vertical transporting of a pet is significant.

Further, the need to walk one's pet cannot be overlooked. While relaxing aboard a boat, or at a pool or a beach, it is inconvenient for a pet owner to carry one apparatus which acts as a safety flotation device, and yet another apparatus for collaring and leashing a pet so as to be able to walk it. Furthermore, it is quite inconvenient to have to remove a safety flotation device from a pet and then place a separate collar about the pets neck so as to be able to walk it, and then to have to remove the collar and re-attach the safety flotation device once the pet's walk is complete. The need for an apparatus which can perform both functions—safety flotation device and traditional leash/collar walking apparatus—is extremely great.

Numerous innovations for pet carrying devices have been provided in the prior art that will be described. Even though these innovations may be suitable for the specific individual purposes to which they address, however, they differ from the present invention in that they do not teach a pet flotation aid and walker that includes a hollow and rectangular-shaped top panel that contains a piece of internal foam floatation material, hollow and trapezoidal-shaped right and left side panels that contain pieces of internal foam floatation material and are generally downwardly bendable from the hollow and rectangular-shaped top panel, trapezoidal-shaped and wide right and left belly flaps that are generally inwardly bendable from the hollow and trapezoidal-shaped right and left side panels, generally concavo-convex-shaped right and left neck flaps that contain pieces of internal foam floatation material and are generally inwardly bendable from the hollow and trapezoidal-shaped right and left side panels, neck flap attaching apparatus for releasibly attaching the generally concavo-convex-shaped right and left neck flaps to each other, a first continuous, light-reflective, and adjustable belly strap, first strap attaching apparatus for releasibly attaching the fixed proximal end and the free distal end of the first continuous, light-reflective, and adjustable belly strap to each other, a second continuous, light-reflective, and adjustable belly strap, and second strap attaching apparatus for releasibly attaching the fixed proximal end and the free distal end of the second continuous, light-reflective, and adjustable belly strap to each other.

FOR EXAMPLE, U.S. Pat. No. 4,489,677 to Handley teaches an animal support apparatus that includes a frame having suspended therefrom a pair of elongate laterally spaced apart members which support a sling therebetween. Flaps are provided at both ends of the sling and are supported by straps which extend up to the corresponding ends of the elongate members.

ANOTHER EXAMPLE, U.S. Pat. No. 4,831,967 to Anderson teaches an animal lift frame that includes a generally rectangular frame portion with front and rear beam members connected by a center beam and right and left side rail members. The center beam carries a slidable counter balance/lifting eye member attachable to a center chain. A series of adjustable length stabilizer straps extend from a point on the center chain to a fixed or adjustable lifting eye on each of the front and rear beam and right and left rail members. A harness or sling is removably secured to the right and left side rails.

STILL ANOTHER EXAMPLE, U.S. Pat. No. 5,044,321 to Selph teaches a protective pet carrier that includes a web and a retraining pouch. The carrier is attached to an associated structure via a hood or alternatively by a plurality of straps or by a frame.

YET ANOTHER EXAMPLE, "Pet Preserver" manufactured by Black Sheep, Inc. of 3220 West Gentry Parkway, Tyler, Tex. 75702, 800-527-6762.

STILL YET ANOTHER EXAMPLE, "Canine Life Jacket" manufactured by Cascade Outfitters of 145 Pioneer Parkway East, P.O. Box 209, Springfield, Oreg. 97477, 800-223-7238.

YET STILL ANOTHER EXAMPLE, "Pooch Preserver" manufactured by Lazy Pet Products of 2521 Loma Avenue, South El Monte, Calif. 91733, 818-453-0153.

STILL YET ANOTHER EXAMPLE, "Pet Vest" manufactured by Omega Marine Products of 1638 Parker Avenue, Ft. Lee, N.J. 070224, 800-966-6342.

YET STILL ANOTHER EXAMPLE, "Safeguard Dog Lifejacket" manufactured by Silk-n-Satin of 11 Joanna Place, Colonia, N.J. 07024, 908-381-2404.

STILL YET ANOTHER EXAMPLE, "Flotation Pet Vest" manufactured by Stearns Manufacturing, Inc. of 1100 Stearns Drive, P.O. Box 1498, Sauk Rapids, Minn. 56379, 612-252-1642.

YET STILL ANOTHER EXAMPLE, "Supersoft Doggie Vest" manufactured by Texas Recreation Company of 908 N. Beverly Drive, Wichita Falls, Tex. 76307, 817-322-4463.

STILL YET ANOTHER EXAMPLE, "Doggie Vest" manufactured by Wellington Puritan Marine, A Division of Wellington Leisure Products, 1140 Monticello Highway, Madison, Ga. 30650, 800-428-2772.

YET STILL ANOTHER EXAMPLE, "Aqua Pet" manufactured by Windborne Products of 114 Lincoln Drive, Sausalito, Calif. 94965, 415-331-3542.

STILL YET ANOTHER EXAMPLE, "No-Pull Halter" manufactured by Four Paws Products, Ltd. of 50 Wireless Blvd., Hauppauge, N.Y. 11788, 516-434-1100.

FINALLY, YET STILL ANOTHER EXAMPLE, my co-pending parent application Ser. No. 08/368,856 filed on Jan. 5, 1995 teaches a flotation aid hoist and walker for pets that includes a vest assembly having a buoyant piece of rectangular material with adjustable vest straps which may be fastened together to secure a pet within the vest assembly. The vest assembly has a strap handle which may be used to lift a pet which is secured within the vest assembly. A separate shoulder harness may be fastened to the strap handle of the vest assembly, so that heavier pets which are secured within the vest assembly may be lifted by hoisting the shoulder harness about a person's shoulder. The shoulder harness may also be used as a pet walking leash. The device also facilitates a pet owner needing to carry only a single leash since the leash supplied with the instant invention is supplied with an adaptor, which is a pet collar attachment connector, and which permits it to be connected to a conventional pet collar. The vest assembly incorporated reflective material therewith, so that pets may be easily seen at night.

It is apparent that numerous innovations for pet carrying devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a pet flotation aid and walker that avoids the disadvantages of the prior art.

ANOTHER OBJECT of the present invention is to provide a pet flotation aid and walker that is simple and inexpensive to manufacture.

STILL ANOTHER OBJECT of the present invention is to provide a pet flotation aid and walker that is simple to use.

YET ANOTHER OBJECT of the present invention is to provide a pet flotation aid and walker that is suitable for large pets.

STILL YET ANOTHER OBJECT of the present invention is to provide a pet flotation aid and walker that is designed to be used on canines and felines of all breeds, sizes, weight, and chest size.

YET STILL ANOTHER OBJECT of the present invention is to provide a pet flotation aid and walker that is primarily intended for the recreational boating/camping/duck-hunting industries, and all other water-related activities.

STILL YET ANOTHER OBJECT of the present invention is to provide a pet flotation aid and walker that affords a floatation aid for a pet in the event that the pet accidentally falls overboard.

YET STILL ANOTHER OBJECT of the present invention is to provide a pet flotation aid and walker that affords a floatation aid for a pet in the likely event that the pet decides to swim in the water.

STILL YET ANOTHER OBJECT of the present invention is to provide a pet flotation aid and walker that helps elevate the pet's head above the water for easy breathing while swimming.

YET STILL ANOTHER OBJECT of the present invention is to provide a pet flotation aid and walker that affords a snug and secure fit that prevents it from "sliding up" and possibly chocking the pet.

STILL YET ANOTHER OBJECT of the present invention is to provide a pet flotation aid and walker that is completely non-corrosive.

YET STILL ANOTHER OBJECT of the present invention is to provide a pet flotation aid and walker that meets United States Coast Guard specifications for minimum buoyancy.

STILL YET ANOTHER OBJECT of the present invention is to provide a pet flotation aid and walker that uses United States Coast Guard approved materials, inter alia, the foam and the release buckles.

YET STILL ANOTHER OBJECT of the present invention is to provide a pet flotation aid and walker that allows for free movement of the pet while the pet swims, walks, runs, sits, or sleeps.

STILL YET ANOTHER OBJECT of the present invention is to provide a pet flotation aid and walker that affords hypothermic protection for the pet while in the water.

BRIEFLY STATED, YET STILL ANOTHER OBJECT of the present invention is to provide a pet flotation aid and walker that is attachable to a pet, wherein the pet has weight, a back, a right side, a left side, a belly, a neck with a back, a chest, a right shoulder, a left shoulder, a throat, a diaphragm, a thoracic cage, a right front leg with a back, and a left front leg with a back, and which includes a hollow and rectangular-shaped top panel, a first piece of internal foam floatation material, a hollow and trapezoidal-shaped right side panel, a second piece of internal foam floatation material, a trapezoidal-shaped and wide right belly flap, a generally concavo-convex-shaped right neck flap, a third piece of internal foam floatation material, a hollow and trapezoidal-shaped left side panel, a fourth piece of internal foam floatation material, a trapezoidal-shaped and wide left belly flap, a generally concavo-convex-shaped left neck flap, a fifth piece of internal foam floatation material, neck flap attaching apparatus, a first continuous, light-reflective, and adjustable belly strap, first strap attaching apparatus, a second continuous, light-reflective, and adjustable belly strap, and second strap attaching apparatus.

STILL YET ANOTHER OBJECT of the present invention is to provide a pet flotation aid and walker wherein the hollow and rectangular-shaped top panel is positionable on the back of the pet and has a pair of parallel and spaced-apart longitudinal sides with ends, a pair of parallel and spaced-apart lateral sides that are perpendicular to, and connect the ends of, the pair of parallel and spaced-apart longitudinal sides of the hollow and rectangular-shaped top panel, and an outer surface.

YET STILL ANOTHER OBJECT of the present invention is to provide a pet flotation aid and walker wherein the first piece of internal foam floatation material is contained in, and generally fills, at least a portion of the hollow and rectangular-shaped top panel.

STILL YET ANOTHER OBJECT of the present invention is to provide a pet flotation aid and walker wherein the hollow and trapezoidal-shaped right side panel is generally downwardly bendable from the hollow and rectangular-shaped top panel and is positionable on the right side of the pet.

YET STILL ANOTHER OBJECT of the present invention is to provide a pet flotation aid and walker wherein the hollow and trapezoidal-shaped right side panel has a pair of parallel and spaced-apart longitudinal sides with rearmost ends and forwardmost ends, a rear lateral side that is perpendicular to, and connect, the rearmost ends of the pair of parallel and spaced-apart longitudinal sides of the hollow and trapezoidal-shaped right side panel, an outer surface, and a slightly skew front side that slants slightly upwardly and forwardly from the forwardmost end of a lowermost longitudinal side of the pair of parallel and spaced-apart longitudinal sides of the hollow and trapezoidal-shaped right side panel to the forwardmost end of an uppermost longitudinal side of the pair of parallel and spaced-apart longitudinal sides of the hollow and trapezoidal-shaped right side panel.

STILL YET ANOTHER OBJECT of the present invention is to provide a pet flotation aid and walker wherein the second piece of internal foam floatation material is contained in, and generally fills, at least a portion of the hollow and trapezoidal-shaped right side panel.

YET STILL ANOTHER OBJECT of the present invention is to provide a pet flotation aid and walker wherein the trapezoidal-shaped and wide right belly flap is generally inwardly bendable from the hollow and trapezoidal-shaped right side panel and is positionable on the belly of the pet.

STILL YET ANOTHER OBJECT of the present invention is to provide a pet flotation aid and walker wherein the trapezoidal-shaped and wide right belly flap has a wide width, a pair of parallel and spaced-apart longitudinal sides with forwardmost ends and rearmost ends, a rear lateral side that is perpendicular to, and connects, the rearmost ends of the pair of parallel and spaced-apart longitudinal sides of the trapezoidal-shaped and wide right belly flap, an outer surface, and a slightly skew front side that slants slightly upwardly and forwardly from the forwardmost end of a lowermost longitudinal side of the pair of parallel and spaced-apart longitudinal sides of the trapezoidal-shaped and wide right belly flap to the forwardmost end of an uppermost longitudinal side of the pair of parallel and spaced-apart longitudinal sides of the trapezoidal-shaped and wide right belly flap.

YET STILL ANOTHER OBJECT of the present invention is to provide a pet flotation aid and walker wherein the generally concavo-convex-shaped right neck flap is generally inwardly bendable from the hollow and trapezoidal-shaped right side panel and is positionable on the neck of the pet and the chest of the pet.

STILL YET ANOTHER OBJECT of the present invention is to provide a pet flotation aid and walker wherein the generally concavo-convex-shaped right neck flap has a concave-shaped side with a forwardmost end and a rearmost end, a convex-shaped side with a forwardmost end and a rearmost end and which is spaced below, and generally parallel to, the concave-shaped side of the generally concavo-convex-shaped right neck flap, a slightly skew rear lateral side that connects the rearmost end of the convex-shaped side of the generally concavo-convex-shaped right neck flap to the rearmost end of the concave-shaped side of the generally concavo-convex-shaped right neck flap, a slightly skew front lateral side that connects the forwardmost end of the convex-shaped side of the generally concavo-convex-shaped right neck flap to the forwardmost end of the concave-shaped side of the generally concavo-convex-shaped right neck flap and which is shorter than, and oppositely slanted from, the slightly skew rear lateral side of the generally concavo-convex-shaped right neck flap, an outer surface, and an inner surface.

YET STILL ANOTHER OBJECT of the present invention is to provide a pet flotation aid and walker wherein the third piece of internal foam floatation material is contained in, and generally filling, at least a portion of the generally concavo-convex-shaped right neck flap.

STILL YET ANOTHER OBJECT of the present invention is to provide a pet flotation aid and walker wherein the hollow and trapezoidal-shaped left side panel is generally downwardly bendable from the hollow and rectangular-shaped top panel and is positionable on the left side of the pet.

YET STILL ANOTHER OBJECT of the present invention is to provide a pet flotation aid and walker wherein the hollow and trapezoidal-shaped left side panel has a pair of parallel and spaced-apart longitudinal sides with rearmost ends and forwardmost ends, a rear lateral side that is perpendicular to, and connects, the rearmost ends of the pair of parallel and spaced-apart longitudinal sides of the hollow and trapezoidal-shaped left side panel, an outer surface, and a slightly skew front side that slants slightly upwardly and forwardly from the forwardmost end of a lowermost longitudinal side of the pair of parallel and spaced-apart longitudinal sides of the hollow and trapezoidal-shaped left side panel to the forwardmost end of an uppermost longitudinal side of the pair of parallel and spaced-apart longitudinal sides of the hollow and trapezoidal-shaped left side panel.

STILL YET ANOTHER OBJECT of the present invention is to provide a pet flotation aid and walker wherein the fourth piece of internal foam floatation material is contained in, and generally filling, at least a portion of the hollow and trapezoidal-shaped left side panel.

YET STILL ANOTHER OBJECT of the present invention is to provide a pet flotation aid and walker wherein the trapezoidal-shaped and wide left belly flap is generally inwardly bendable from the hollow and trapezoidal-shaped left side panel and is positionable on the belly of the pet.

STILL YET ANOTHER OBJECT of the present invention is to provide a pet flotation aid and walker wherein the trapezoidal-shaped and wide left belly flap has a wide width, a pair of parallel and spaced-apart longitudinal sides with forwardmost ends and rearmost ends, a rear lateral side that is perpendicular to, and connects the rearmost ends of, the pair of parallel and spaced-apart longitudinal sides of the trapezoidal-shaped and wide left belly flap, an outer surface, and a slightly skew front side that slants slightly upwardly and forwardly from the forwardmost end of a lowermost longitudinal side of the pair of parallel and spaced-apart longitudinal sides of the trapezoidal-shaped and wide left belly flap to the forwardmost end of an uppermost longitudinal side of the pair of parallel and spaced-apart longitudinal sides of the trapezoidal-shaped and wide left belly flap.

YET STILL ANOTHER OBJECT of the present invention is to provide a pet flotation aid and walker wherein the generally concavo-convex-shaped left neck flap is generally inwardly bendable from the hollow and trapezoidal-shaped left side panel and is positionable on the neck of the pet and the chest of the pet.

STILL YET ANOTHER OBJECT of the present invention is to provide a pet flotation aid and walker wherein the generally concavo-convex-shaped left neck flap has a concave-shaped side with a forwardmost end and a rearmost end, a convex-shaped side with a forwardmost end and a rearmost end and which is spaced below, and generally parallel to, the concave-shaped side of the generally concavo-convex-shaped left neck flap, a slightly skew rear lateral side that connects the rearmost end of the convex-shaped side of the generally concavo-convex-shaped left neck flap to the rearmost end of the concave-shaped side of the generally concavo-convex-shaped left neck flap, a slightly skew front lateral side that connects the forwardmost end of the convex-shaped side of the generally concavo-convex-shaped left neck flap to the forwardmost end of the concave-shaped side of the generally concavo-convex-shaped left neck flap and is shorter than, and oppositely slanted from, the slightly skew rear lateral side of the generally concavo-convex-shaped left neck flap, an outer surface, and a inner surface.

YET STILL ANOTHER OBJECT of the present invention is to provide a pet flotation aid and walker wherein the generally concavo-convex-shaped left neck flap is separate and detachable from the generally concavo-convex-shaped right neck flap, so that the pet flotation aid and walker can be easily removed from the chest of the pet without having to lift the pet, especially when the pet is large.

STILL YET ANOTHER OBJECT of the present invention is to provide a pet flotation aid and walker wherein the fifth piece of internal foam floatation material is contained in, and generally filling, at least a portion of the generally concavo-convex-shaped left neck flap.

YET STILL ANOTHER OBJECT of the present invention is to provide a pet flotation aid and walker wherein the neck flap attaching apparatus releasibly attaches the generally concavo-convex-shaped right neck flap and the generally concavo-convex-shaped left neck flap to each other when the generally concavo-convex-shaped right neck flap and the generally concavo-convex-shaped left neck flap are positioned on the neck of the pet and the chest of the pet, so that the pet floatation aid and walker is releasibly secured around the neck of the pet and the chest of the pet.

STILL YET ANOTHER OBJECT of the present invention is to provide a pet flotation aid and walker wherein the first continuous, light-reflective, and adjustable belly strap has a fixed proximal end and a free distal end and extends across the hollow and trapezoidal-shaped left side panel, the hollow and rectangular-shaped top panel, the hollow and trapezoidal-shaped right side panel, the trapezoidal-shaped and wide right belly flap, and is extendable across the trapezoidal-shaped and wide left belly flap.

YET STILL ANOTHER OBJECT of the present invention is to provide a pet flotation aid and walker wherein the first strap attaching apparatus releasibly attaches the fixed proximal end of the first continuous, light-reflective, and adjustable belly strap to the free distal end of the first continuous, light-reflective, and adjustable belly strap, so that another portion of the pet floatation aid and walker is releasibly secured around the back of the pet, the right side of the pet, the left side of the pet, and the belly of the pet.

STILL YET ANOTHER OBJECT of the present invention is to provide a pet flotation aid and walker wherein the second continuous, light-reflective, and adjustable belly strap has a fixed proximal end and a free distal end and extends across the hollow and trapezoidal-shaped left side panel, the hollow and rectangular-shaped top panel, the hollow and trapezoidal-shaped right side panel, the trapezoidal-shaped and wide right belly flap, and is extendable across the trapezoidal-shaped wide and left belly flap.

YET STILL ANOTHER OBJECT of the present invention is to provide a pet flotation aid and walker wherein the second strap attaching apparatus releasibly attaches the fixed proximal end of the second continuous, light-reflective, and adjustable belly strap to the free distal end of the second continuous, light-reflective, and adjustable belly strap, so that a remaining portion of the pet floatation aid and walker is releasibly secured around the back of the pet, the right side of the pet, the left side of the pet, and the belly of the pet and thereby the pet floatation aid and walker is completely releasibly secured on the pet and can removed from the pet extremely quickly without bother, by simply unfastening the neck flap attaching apparatus, the first strap attaching apparatus, and the second strap attaching apparatus.

STILL YET ANOTHER OBJECT of the present invention is to provide a pet flotation aid and walker wherein the uppermost longitudinal side of the pair of parallel and spaced-apart longitudinal sides of the hollow and trapezoidal-shaped right side panel is coincident with a right longitudinal side of the pair of parallel and spaced-apart longitudinal sides of the hollow and rectangular-shaped top panel.

YET STILL ANOTHER OBJECT of the present invention is to provide a pet flotation aid and walker wherein the rear lateral side of the hollow and trapezoidal-shaped right side panel is collinear with a rearmost lateral side of the pair of parallel and spaced-apart lateral sides of the hollow and rectangular-shaped top panel.

STILL YET ANOTHER OBJECT of the present invention is to provide a pet flotation aid and walker wherein the slightly skew front side of the hollow and trapezoidal-shaped right side panel provides a boundary that is generally complementary to, and generally unobstructive to movement of, the right shoulder of the pet as a result of slanting rearwardly and downwardly from the back of the neck of the pet to the back of the right front leg of the pet since the back of the right front leg of the pet is disposed behind the back of the neck of the pet, so that the right front leg of the pet can move without any significant obstruction thereto.

YET STILL ANOTHER OBJECT of the present invention is to provide a pet flotation aid and walker wherein the uppermost longitudinal side of the pair of parallel and spaced-apart longitudinal sides of the trapezoidal-shaped and wide right belly flap is coincident with the lowermost longitudinal side of the pair of parallel and spaced-apart longitudinal sides of the hollow and trapezoidal-shaped right side panel.

STILL YET ANOTHER OBJECT of the present invention is to provide a pet flotation aid and walker wherein the rear lateral side of the trapezoidal-shaped and wide right belly flap is collinear with the rear lateral side of the hollow and trapezoidal-shaped right side panel.

YET STILL ANOTHER OBJECT of the present invention is to provide a pet flotation aid and walker wherein the slightly skew front side of the trapezoidal-shaped and wide right belly flap is generally collinear with the slightly skew front side of the hollow and trapezoidal-shaped right side panel.

STILL YET ANOTHER OBJECT of the present invention is to provide a pet flotation aid and walker wherein the slightly skew front side of the trapezoidal-shaped and wide right belly flap provides general clearance of, and less transferred load to, the diaphragm in the thoracic cage of the pet and thereby allowing easier breathing for the pet when the pet is lifted, so that additional comfort is provided for the pet.

YET STILL ANOTHER OBJECT of the present invention is to provide a pet flotation aid and walker wherein the slightly skew rear lateral side of the generally concavo-convex-shaped right neck flap is coincident with the slightly skew front side of the hollow and trapezoidal-shaped right side panel.

STILL YET ANOTHER OBJECT of the present invention is to provide a pet flotation aid and walker wherein the concave-shaped side of the generally concavo-convex-shaped right neck flap extends smoothly into a forwardmost lateral side of the pair of parallel and spaced-apart lateral sides of the hollow and rectangular-shaped top panel.

YET STILL ANOTHER OBJECT of the present invention is to provide a pet flotation aid and walker wherein the convex-shaped side of the generally concavo-convex-shaped right neck flap extends smoothly, in a small concave arc, into the slightly skew front side of the trapezoidal-shaped and wide right belly flap.

STILL YET ANOTHER OBJECT of the present invention is to provide a pet flotation aid and walker wherein the concave-shaped side of the generally concavo-convex-shaped right neck flap provides a boundary that generally clears the throat of the pet, so that the pet can breath comfortably.

YET STILL ANOTHER OBJECT of the present invention is to provide a pet flotation aid and walker wherein the convex-shaped side of the generally concavo-convex-shaped right neck flap provides a boundary that generally clears the expanding portion of the chest of the pet, so that the pet can breath even more comfortably.

STILL YET ANOTHER OBJECT of the present invention is to provide a pet flotation aid and walker wherein the small concave arc of the convex-shaped side of the generally concavo-convex-shaped right neck flap provides a boundary that is generally complementary to, and generally unobstructive of, the right shoulder of the pet, so that the right front leg of the pet can move without any significant obstruction thereto.

YET STILL ANOTHER OBJECT of the present invention is to provide a pet flotation aid and walker wherein the uppermost longitudinal side of the pair of parallel and spaced-apart longitudinal sides of the hollow and trapezoidal-shaped left side panel is coincident with a left longitudinal side of the pair of parallel and spaced-apart longitudinal sides of the hollow and rectangular-shaped top panel.

STILL YET ANOTHER OBJECT of the present invention is to provide a pet flotation aid and walker wherein the rear lateral side of the hollow and trapezoidal-shaped left side panel is collinear with a rearmost lateral side of the pair of parallel and spaced-apart lateral sides of the hollow and rectangular-shaped top panel.

YET STILL ANOTHER OBJECT of the present invention is to provide a pet flotation aid and walker wherein the slightly skew front side of the hollow and trapezoidal-shaped left side panel provides a boundary that is generally complementary to, and generally unobstructive to movement of, the left shoulder of the pet as a result of slanting rearwardly and downwardly from the back of the neck of the pet to the back of the left front leg of the pet since the back of the left front leg of the pet is disposed behind the back of the neck of the pet, so that the left front leg of the pet can move without any significant obstruction thereto.

STILL YET ANOTHER OBJECT of the present invention is to provide a pet flotation aid and walker wherein the uppermost longitudinal side of the pair of parallel and spaced-apart longitudinal sides of the trapezoidal-shaped and wide left belly flap is coincident with the lowermost longitudinal side of the pair of parallel and spaced-apart longitudinal sides of the hollow and trapezoidal-shaped left side panel.

YET STILL ANOTHER OBJECT of the present invention is to provide a pet flotation aid and walker wherein the rear lateral side of the trapezoidal-shaped and wide left belly flap is collinear with the rear lateral side of the hollow and trapezoidal-shaped left side panel.

STILL YET ANOTHER OBJECT of the present invention is to provide a pet flotation aid and walker wherein the slightly skew front side of the trapezoidal-shaped and wide left belly flap is generally collinear with the slightly skew front side of the hollow and trapezoidal-shaped left side panel.

YET STILL ANOTHER OBJECT of the present invention is to provide a pet flotation aid and walker wherein the slightly skew front side of the trapezoidal-shaped and wide left belly flap provides general clearance of, and less transferred load to, the diaphragm in the thoracic cage of the pet and thereby allowing easier breathing for the pet when the pet is lifted, so that additional comfort is provided for the pet.

STILL YET ANOTHER OBJECT of the present invention is to provide a pet flotation aid and walker wherein the overlapping of the trapezoidal-shaped and wide right belly flap on the trapezoidal-shaped left belly flap prevents the second continuous, light-reflective, and adjustable belly strap, the second strap attaching apparatus, the first continuous, light-reflective, and adjustable belly strap, and the first strap attaching apparatus from digging into the belly of the pet when lifted, so that comfort is provided for the pet.

YET STILL ANOTHER OBJECT of the present invention is to provide a pet flotation aid and walker wherein the wide width of the trapezoidal-shaped and wide right belly flap and the wide width of the trapezoidal-shaped and wide left belly flap distribute the weight of the pet, especially in heavy pets, over a greater area of the belly of the pet when the pet is lifted, so that additional comfort is provided for the pet.

STILL YET ANOTHER OBJECT of the present invention is to provide a pet flotation aid and walker wherein the slightly skew rear lateral side of the generally concavo-convex-shaped left neck flap is coincident with the slightly skew front side of the hollow and trapezoidal-shaped left side panel.

YET STILL ANOTHER OBJECT of the present invention is to provide a pet flotation aid and walker wherein the concave-shaped side of the generally concavo-convex-shaped left neck flap extends smoothly into a forwardmost lateral side of the pair of parallel and spaced-apart lateral sides of the hollow and rectangular-shaped top panel.

STILL YET ANOTHER OBJECT of the present invention is to provide a pet flotation aid and walker wherein the convex-shaped side of the generally concavo-convex-shaped left neck flap extends smoothly, in a small concave arc, into the slightly skew front side of the trapezoidal-shaped and wide left belly flap.

YET STILL ANOTHER OBJECT of the present invention is to provide a pet flotation aid and walker wherein the concave-shaped side of the generally concavo-convex-shaped left neck flap provides a boundary that generally clears the throat of the pet, so that the pet can breath comfortably.

STILL YET ANOTHER OBJECT of the present invention is to provide a pet flotation aid and walker wherein the convex-shaped side of the generally concavo-convex-shaped left neck flap provides a boundary that generally clears the expanding portion of the chest of the pet, so that the pet can breath even more comfortably.

YET STILL ANOTHER OBJECT of the present invention is to provide a pet flotation aid and walker wherein the small concave arc of the convex-shaped side of the generally concavo-convex-shaped left neck flap provides a boundary that is generally complementary to, and generally unobstructive of, the left shoulder of the pet, so that the left front leg of the pet can move without any significant obstruction thereto.

STILL YET ANOTHER OBJECT of the present invention is to provide a pet flotation aid and walker wherein the fixed proximal end of the first continuous, light-reflective, and adjustable belly strap is fixedly attached, by stitching, to the outer surface of the hollow and trapezoidal-shaped left side panel, at a substantial midpoint between the pair of parallel and spaced-apart longitudinal sides of the hollow and trapezoidal-shaped left side panel, and in proximity to the rear lateral side of the hollow and trapezoidal-shaped left side panel.

YET STILL ANOTHER OBJECT of the present invention is to provide a pet flotation aid and walker wherein the first continuous, light-reflective, and adjustable belly strap extends along, and is fixedly attached by stitching to, the outer surface of the hollow and trapezoidal-shaped left side panel, in proximity of, and parallel to, the rear lateral side of the hollow and trapezoidal-shaped left side panel.

STILL YET ANOTHER OBJECT of the present invention is to provide a pet flotation aid and walker wherein the first continuous, light-reflective, and adjustable belly strap continues to extend along, and is fixedly attached by stitching to, the outer surface of the hollow and rectangular-shaped top panel, in proximity of, and parallel to, a rearmost lateral side of the pair of parallel and spaced-apart lateral sides of the hollow and rectangular-shaped top panel.

YET STILL ANOTHER OBJECT of the present invention is to provide a pet flotation aid and walker wherein the first continuous, light-reflective, and adjustable belly strap continues to extend along, and is fixedly attached by stitching to, the outer surface of the hollow and trapezoidal-shaped right side panel, in proximity of, and parallel to, the rear lateral side of the hollow and trapezoidal-shaped right side panel.

STILL YET ANOTHER OBJECT of the present invention is to provide a pet flotation aid and walker wherein the first continuous, light-reflective, and adjustable belly strap continues to extend along, and is fixedly attached by stitching to, the outer surface of the trapezoidal-shaped and wide right belly flap, in proximity of, and parallel to, the rear lateral side of the trapezoidal-shaped and wide right belly flap, and which terminates freely past the lowermost longitudinal side of the pair of parallel and spaced-apart longitudinal sides of the trapezoidal-shaped and wide right belly flap as the free distal end of the first continuous, light-reflective, and adjustable belly strap.

YET STILL ANOTHER OBJECT of the present invention is to provide a pet flotation aid and walker wherein the first strap attaching apparatus includes an easy release buckle female portion that is disposed in a stitched loop formed by the fixed proximal end of the first continuous, light-reflective, and adjustable belly strap.

STILL YET ANOTHER OBJECT of the present invention is to provide a pet flotation aid and walker wherein the first strap attaching apparatus further includes an easy release buckle male portion that is adjustably attached to the free distal end of the first continuous, light-reflective, and adjustable belly strap, and which is releasibly engagable with the easy release buckle female portion of the first strap attaching apparatus.

YET STILL ANOTHER OBJECT of the present invention is to provide a pet flotation aid and walker wherein the second continuous, light-reflective, and adjustable belly strap is parallel to, and disposed forward of, the first continuous, light-reflective, and adjustable belly strap.

STILL YET ANOTHER OBJECT of the present invention is to provide a pet flotation aid and walker wherein the fixed proximal end of the second continuous, light-reflective, and adjustable belly strap is fixedly attached, by stitching, to the outer surface of the hollow and trapezoidal-shaped left side panel, at a substantial midpoint between the pair of parallel and spaced-apart longitudinal sides of the hollow and trapezoidal-shaped left side panel, and in proximity to the slightly skew front side of the hollow and trapezoidal-shaped left side panel.

YET STILL ANOTHER OBJECT of the present invention is to provide a pet flotation aid and walker wherein the second continuous, light-reflective, and adjustable belly strap extends along, and is fixedly attached by stitching to, the outer surface of the hollow and trapezoidal-shaped left side panel, in proximity to the slightly skew front side of the hollow and trapezoidal-shaped left side panel.

STILL YET ANOTHER OBJECT of the present invention is to provide a pet flotation aid and walker wherein the second continuous, light-reflective, and adjustable belly strap continues to extend along, and is fixedly attached by stitching to, the outer surface of the hollow and rectangular-shaped top panel, in proximity of, and parallel to, a forwardmost lateral side of the pair of parallel and spaced-apart lateral sides of the hollow and rectangular-shaped top panel.

YET STILL ANOTHER OBJECT of the present invention is to provide a pet flotation aid and walker wherein the second continuous, light-reflective, and adjustable belly strap continues to extend along, and is fixedly attached by stitching to, the outer surface of the hollow and trapezoidal-shaped right side panel, in proximity of the slightly skew front side of the hollow and trapezoidal-shaped right side panel.

STILL YET ANOTHER OBJECT of the present invention is to provide a pet flotation aid and walker wherein the second continuous, light-reflective, and adjustable belly strap continues to extend along, and is fixedly attached by stitching to, the outer surface of the trapezoidal-shaped and wide right belly flap, in proximity of the slightly skew front side of the trapezoidal-shaped and wide right belly flap, and which terminates freely past a lowermost longitudinal side of the pair of parallel and spaced-apart longitudinal sides of the trapezoidal-shaped and wide right belly flap as the free distal end of the second continuous, light-reflective, and adjustable belly strap.

YET STILL ANOTHER OBJECT of the present invention is to provide a pet flotation aid and walker wherein the second strap attaching apparatus includes an easy release buckle female portion that is disposed in a stitched loop formed by the fixed proximal end of the second continuous, light-reflective, and adjustable belly strap.

STILL YET ANOTHER OBJECT of the present invention is to provide a pet flotation aid and walker wherein the second strap attaching apparatus further includes an easy release buckle male portion that is adjustably attached to the free distal end of the second continuous, light-reflective, and adjustable belly strap, and which is releasibly engagable with the easy release buckle female portion of the second strap attaching apparatus.

YET STILL ANOTHER OBJECT of the present invention is to provide a pet flotation aid and walker that further includes a rectangular-shaped logo patch that is fixedly attached, by stitching, to the outer surface of the hollow and trapezoidal-shaped left side panel and extends from the second continuous, light-reflective, and adjustable belly strap to the first continuous, light-reflective, and adjustable belly strap, and from the fixed proximal end of the first continuous, light-reflective, and adjustable belly strap and the fixed proximal end of the second continuous, light-reflective, and adjustable belly strap to proximity of a left longitudinal side of the pair of parallel and spaced-apart longitudinal sides of the hollow and rectangular-shaped top panel.

STILL YET ANOTHER OBJECT of the present invention is to provide a pet flotation aid and walker wherein the rectangular-shaped logo patch bears silk-screened indicia thereon that is easily readable when the pet flotation aid and walker is donned on the pet.

YET STILL ANOTHER OBJECT of the present invention is to provide a pet flotation aid and walker that further includes a rectangular-shaped, self-draining, and nylon mesh pocket that is expandable at a lower side thereof and is fixedly attached, by stitching on three sides thereof, to the outer surface of the hollow and trapezoidal-shaped right side panel, and extends from the second continuous, light-reflective, and adjustable belly strap to the first continuous, light-reflective, and adjustable belly strap, and from a lowermost longitudinal side of the pair of parallel and spaced-apart longitudinal sides of the hollow and trapezoidal-shaped right side panel to proximity of a right longitudinal side of the pair of parallel and spaced-apart longitudinal sides of the hollow and rectangular-shaped top panel, where the rectangular-shaped, self-draining, and nylon mesh pocket terminates in an open top, so that a light-reflective leash, pet items, and any personal items that are deemed appropriate by the pet owner can be stored therein, if so desired.

STILL YET ANOTHER OBJECT of the present invention is to provide a pet flotation aid and walker that further includes hook and loop fasteners that selectively open and close the open top of the rectangular-shaped, self-draining, and nylon mesh pocket.

YET STILL ANOTHER OBJECT of the present invention is to provide a pet flotation aid and walker wherein a portion of the hook and loop fasteners of the rectangular-shaped, self-draining, and nylon mesh pocket is disposed on an inner surface of the open top of the rectangular-shaped, self-draining, and nylon mesh pocket and a mating portion of the hook and loop fasteners is disposed on a corresponding position on the outer surface of the hollow and trapezoidal-shaped right side panel.

STILL YET ANOTHER OBJECT of the present invention is to provide a pet flotation aid and walker that further includes a continuous and light-reflective grab handle that is disposed on the outer surface of the hollow and rectangular-shaped top panel, between, and parallel to, the pair of parallel and spaced-apart longitudinal sides of the hollow and rectangular-shaped top panel, and extends freely from a rearmost lateral side of the pair of parallel and spaced-apart lateral sides of the hollow and rectangular-shaped top panel, where the continuous and light-reflective grab handle is fixedly attached by stitching, to a forwardmost lateral side of the pair of parallel and spaced-apart lateral sides of the hollow and rectangular-shaped top panel, where the continuous and light-reflective grab handle is fixedly attached by stitching, and where the continuous and light-reflective grab handle forms a loop that houses a D-shaped leash ring that can be replaceably engagable by a light-reflective leash, so that a pet owner can safely, quickly and easily raise and lower a pet from a dock to a boat, from the boat to the dock, from the boat to a tender, from the tender to the boat, in and out of a body of water.

YET STILL ANOTHER OBJECT of the present invention is to provide a pet flotation aid and walker wherein the neck flap attaching apparatus includes hook and loop fasteners.

STILL YET ANOTHER OBJECT of the present invention is to provide a pet flotation aid and walker wherein one portion of the hook and loop fasteners of the neck flap attaching apparatus is disposed on the inner surface of the generally concavo-convex-shaped right neck flap, in proximity to the slightly skew front lateral side of the generally concavo-convex-shaped right neck flap.

YET STILL ANOTHER OBJECT of the present invention is to provide a pet flotation aid and walker wherein a mating portion of the hook and loop fasteners of the neck flap attaching apparatus is disposed on the outer surface of the generally concavo-convex-shaped left neck flap, in proximity to the slightly skew front lateral side of the generally concavo-convex-shaped left neck flap, and which is releasibly engagable with the one portion of the hook and loop fasteners of the neck flap attaching apparatus so as to prevent relative shifting between the generally concavo-convex-shaped right neck flap and the generally concavo-convex-shaped left neck flap, so that crimping of at least one of the generally concavo-convex-shaped right neck flap and the generally concavo-convex-shaped left neck flap is prevented that could dig into the chest of the pet and the neck of the pet, especially pets with small necks when the overlapping is greater, and thereby providing additional comfort for the pet.

STILL YET ANOTHER OBJECT of the present invention is to provide a pet flotation aid and walker wherein the neck flap attaching apparatus further includes a continuous and light-reflective short strap that is disposed on the outer surface of the generally concavo-convex-shaped left neck flap, and which extends freely from a substantial midpoint between the slightly skew rear lateral side of the generally concavo-convex-shaped left neck flap and the mating portion of the hook and loop fasteners of the neck flap attaching apparatus, where the continuous and light-reflective short strap of the neck flap attaching apparatus is fixedly attached by stitching, to a length short of the mating portion of the hook and loop fasteners of the neck flap attaching apparatus, where the continuous and light-reflective short strap of the neck flap attaching apparatus terminates freely in a terminal free end.

YET STILL ANOTHER OBJECT of the present invention is to provide a pet flotation aid and walker wherein the neck flap attaching apparatus further includes an easy release buckle female portion that is disposed in a stitched loop formed at the terminal free end of the continuous and light-reflective short strap of the neck flap attaching apparatus.

STILL YET ANOTHER OBJECT of the present invention is to provide a pet flotation aid and walker wherein the neck flap attaching apparatus further includes a continuous and light-reflective long strap that is disposed on the outer surface of the generally concavo-convex-shaped right neck flap, and which is longer than the continuous and light-reflective short strap of the neck flap attaching apparatus.

YET STILL ANOTHER OBJECT of the present invention is to provide a pet flotation aid and walker wherein the continuous and light-reflective long strap of the neck flap attaching apparatus extends freely from a substantial midpoint between the slightly skew rear lateral side of the generally concavo-convex-shaped right neck flap and the one portion of the hook and loop fasteners of the neck flap attaching apparatus, where the continuous and light-reflective long strap of the neck flap attaching apparatus is fixedly attached by stitching, to a length past the slightly skew front lateral side of the generally concavo-convex-shaped right neck flap, where the continuous and light-reflective long strap of the neck flap attaching apparatus terminates freely in a terminal free end.

STILL YET ANOTHER OBJECT of the present invention is to provide a pet flotation aid and walker wherein the neck flap attaching apparatus further includes an easy release buckle male portion that is adjustably attached to the terminal free end of the continuous and light-reflective long strap of the neck flap attaching apparatus, and which is releasibly engagable with the easy release buckle female portion of the neck flap attaching apparatus.

YET STILL ANOTHER OBJECT of the present invention is to provide a pet flotation aid and walker wherein the overlapping of the generally concavo-convex-shaped right neck flap on the generally concavo-convex-shaped left neck flap prevents at least a part of the neck flap attaching apparatus from digging into the chest of the pet and the neck of the pet and allows adjustments for pets with different sized necks, especially those with large necks, while providing an additional secure and safe link, between the generally concavo-convex-shaped right neck flap and the generally concavo-convex-shaped left neck flap.

STILL YET ANOTHER OBJECT of the present invention is to provide a pet flotation aid and walker wherein each of the first continuous, light-reflective, and adjustable belly strap, the second continuous, light-reflective, and adjustable belly strap, the continuous and light-reflective long strap of the neck flap attaching apparatus, the continuous and light-reflective short strap of the neck flap attaching apparatus, and a light-reflective leash is selected from the group consisting of nylon webbing and polypropylene webbing, and which has three continuous, parallel, and closely spaced-apart strands of reflective material that yields 500 candle-power when shined upon interwoven therethrough along a longitudinally centerline thereof, so that a pet owner, by using a light, can quickly and easily locate and identify the pet at night.

STILL YET ANOTHER OBJECT of the present invention is to provide a pet flotation aid and walker that further includes a hook and loop fastener closable pocket disposed on the outer surface of the generally concavo-convex-shaped right neck flap for holding at least a pet's ID tag.

FINALLY, STILL YET ANOTHER OBJECT of the present invention is to provide a method of donning a pet flotation aid and walker on a pet, wherein the pet has a back, a right side, a left side, a neck, and a chest that includes the steps of placing a hollow and rectangular-shaped top panel that contains foam floatation material of the pet flotation aid and walker on the back of the pet, with a hollow and trapezoidal-shaped right side panel that contains foam floatation material of the pet flotation aid and walker bending downwardly onto the right side of the pet, with a hollow and trapezoidal-shaped left side panel that contains foam floatation material of the pet flotation aid and walker bending downwardly onto the left side of the pet, and with a generally concavo-convex-shaped right neck flap that contains foam floatation material of the pet flotation aid and walker and a generally concavo-convex-shaped left neck flap containing foam floatation material of the pet flotation aid and walker extending forwardly, bending a trapezoidal-shaped and wide left belly flap of the pelt flotation aid and walker inwardly onto the belly of the pet, bending a trapezoidal-shaped and wide right belly flap of the pet flotation aid and walker inwardly and overlapping the trapezoidal-shaped and wide left belly flap, extending a first continuous, light-reflective, and adjustable belly strap of the pet flotation aid and walker over the trapezoidal-shaped and wide left belly flap, engaging releasibly a properly adjusted first easy release buckle male portion of the first continuous, light-reflective, and adjustable belly strap with a first easy release buckle female portion of the first continuous, light-reflective, and adjustable belly strap, so that a portion of the pet flotation aid and walker is secured around the back of the pet, the right side of the pet, the left side of the pet, and the belly of the pet, extending a second continuous, light-reflective, and adjustable belly strap of the pet flotation aid and walker over the trapezoidal-shaped and wide left belly flap, engaging releasibly a properly adjusted second easy release buckle male portion of the second continuous, light-reflective, and adjustable belly strap with a second easy release buckle female portion of the second continuous, light-reflective, and adjustable belly strap, so that another portion of the pet flotation aid and walker is secured around the back of the pet, the right side of the pet, the left side of the pet, and the belly of the pet, bending the generally concavo-convex-shaped left neck flap inwardly onto the neck of the pet and the chest of the pet, bending the generally concavo-convex-shaped right neck flap inwardly and overlapping the generally concavo-convex-shaped left neck flap, engaging releasibly a hook portion of hook and loop fasteners disposed on an inner surface of the generally concavo-convex-shaped right neck flap with a loop portion of the hook and loop fasteners disposed on an outer surface of the generally concavo-convex-shaped left neck flap, extending a continuous and light-reflective long strap of the generally concavo-convex-shaped right neck flap over the generally concavo-convex-shaped left neck flap, and engaging releasibly a properly adjusted easy release buckle male portion of the generally concavo-convex-shaped right neck flap with an easy release buckle female portion of the generally concavo-convex-shaped left neck flap, so that the pet flotation aid and walker is now securely donned around the neck of the pet and the chest of the pet and thereby now completely securely donned on the pet.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view of the present invention installed on a pet;

FIG. 2 is a diagrammatic perspective view of the present invention installed on the pet and being used to walk the pet;

FIG. 3 is an enlarged diagrammatic top plan view of the present invention spread out flat;

FIG. 4 is an enlarged diagrammatic bottom plan view of the present invention spread out flat;

FIG. 5 is a diagrammatic perspective view of the present invention shown generally in the operating orientation; and FIG. 6 is a diagrammatic perspective view of the area generally enclosed by the dotted circle identified generally by arrow 6 in FIG. 5.

LIST OF REFERENCE NUMERALS UTILIZED IN THE DRAWING 10 pet flotation aid and walker of the present invention
12 pet
14 pet back
16 pet pair of body sides
18 pet belly
20 pet neck
21 pet chest
22 light-reflective leash
24 pet walker
26 hollow and rectangular-shaped top panel
28 top panel pair of parallel and spaced-apart longitudinal sides
30 top panel pair of parallel and spaced-apart lateral sides
32 top panel outer surface
34 top panel substantially correspondingly shaped piece of internal foam floatation material
36 hollow and trapezoidal-shaped right side panel
38 right side panel pair of parallel and spaced-apart longitudinal sides
40 right side panel rear lateral side
42 right side panel outer surface
44 right side panel substantially correspondingly shaped piece of internal foam floatation material
46 right side panel slightly skew front side
48 trapezoidal-shaped right belly flap
50 right belly flap pair of parallel and spaced-apart longitudinal sides
52 right belly flap rear lateral side
54 right belly flap outer surface
56 right belly flap slightly skew front side
58 generally concavo-convex-shaped right neck flap
60 right neck flap concave-shaped side
62 right neck flap convex-shaped side
64 right neck flap slightly skew rear lateral side
66 right neck flap slightly skew front lateral side
68 right neck flap outer surface
70 right neck flap inner surface
72 right neck flap substantially correspondingly shaped piece of internal foam floatation material
74 hollow and trapezoidal-shaped left side panel
76 left side panel pair of parallel and spaced-apart longitudinal sides
78 left side panel rear lateral side
80 left side panel outer surface
82 left side panel substantially correspondingly shaped piece of internal foam floatation material
84 left side panel slightly skew front side
86 trapezoidal-shaped left belly flap
88 left belly flap pair of parallel and spaced-apart longitudinal sides
90 left belly flap rear lateral side
92 left belly flap slightly skew front side
94 generally concavo-convex-shaped left neck flap
96 left neck flap concave-shaped side
98 left neck flap convex-shaped side
100 left neck flap slightly skew rear lateral side
102 left neck flap slightly skew front lateral side
104 left neck flap outer surface
106 left neck flap substantially correspondingly shaped piece of internal foam floatation material
108 first continuous, light-reflective, and adjustable belly strap
110 first belly strap fixed proximal end
112 first belly strap free distal end
114 first belly strap proximal end easy release buckle female portion
116 first belly strap free distal end easy release buckle male portion
118 second continuous, light-reflective, and adjustable belly strap
120 second belly strap fixed proximal end
122 second belly strap free distal end
124 second belly strap proximal end easy release buckle female portion
125 second belly strap free distal end easy release buckle male portion
126 rectangular-shaped logo patch
128 rectangular-shaped, self-draining, and nylon mesh pocket 130 pocket closing hook and loop fasteners (VELCRO(™))
132 continuous and light-reflective grab handle
134 D-shaped leash ring
136 right neck flap inner surface attaching hook and loop fasteners (VELCRO(™)) hook portion
138 left neck flap outer surface attaching hook and loop fasteners (VELCRO(™)) loop portion
140 left neck flap outer surface continuous and light-reflective short strap
142 left neck strap free terminal end easy release buckle female portion
144 right neck flap outer surface continuous and light-reflective long strap
146 right neck strap free terminal end easy release buckle male portion
148 three continuous, parallel, and closely spaced-apart strands of reflective material

DETAILED DESCRIPTION OF THE PREFERRED EMBODIMENT

Referring now to the figures, in which like numerals indicate like parts, and particularly to FIG. 1, which is a diagrammatic perspective view of the present invention installed on a pet, the pet flotation aid and walker of the present invention is shown generally at 10 replaceably installed on a pet 12 that has a pet back 14, a pet pair of body sides 16, a pet belly 18, a pet neck 20, and a pet chest 21.

As shown in FIG. 2, which is a diagrammatic perspective view of the present invention installed on a pet and being used to walk the pet, the pet flotation aid and walker 10 that is installed on the pet 10 can have a light-reflective leash 22 replaceably attached thereto that can be held by a pet walker 24, so that the pet 12 can be safely walked, inter alia, on land and shore.

The configuration of the pet flotation aid and walker 10 can best be seen in FIGS. 3–6, and as such will be discussed with reference thereto.

As shown in FIGS. 3 and 4, which are an enlarged diagrammatic top plan view of the present invention spread out flat, and an enlarged diagrammatic bottom plan view of the present invention spread out flat, respectively, the pet flotation aid and walker 10 includes a hollow and rectangular-shaped top panel 26 that has a top panel pair of parallel and spaced-apart longitudinal sides 28, a top panel pair of parallel and spaced-apart lateral sides 30 that are perpendicular to, and connect the ends of, the top panel pair of parallel and spaced-apart longitudinal sides 28 of the hollow and rectangular-shaped top panel 26, a tog panel outer surface 32, and a top panel substantially correspondingly shaped piece of internal foam floatation material 34 that is contained in, and generally fills, at least a part of the hollow and rectangular-shaped top panel 26.

The pet flotation aid and walker 10 further includes a hollow and trapezoidal-shaped right side panel 36 that has a right side panel pair of parallel and spaced-apart longitudinal sides 38, a right side panel rear lateral side 40 that is perpendicular to, and connects, the rearmost ends of the right side panel pair of parallel and spaced-apart longitudinal sides 38 of the hollow and trapezoidal-shaped right side panel 36, a right side panel outer surface 42, a right side panel substantially correspondingly shaped piece of internal foam floatation material 44 that is contained in, and generally fills, the hollow and trapezoidal-shaped right side panel 36, and a right side panel slightly skew front side 46 that slants slightly upwardly and forwardly from the forwardmost end of the lowermost longitudinal side of the right side panel pair of parallel and spaced-apart longitudinal sides 38 of the hollow and trapezoidal-shaped right side panel 36 to the forwardmost end of the uppermost longitudinal side of the right side panel pair of parallel and spaced-apart longitudinal sides 38 of the hollow and trapezoidal-shaped right side panel 36.

As shown in FIG. 5, which is a diagrammatic perspective view of the present invention shown generally in the operating orientation, the hollow and trapezoidal-shaped right side panel 36 is generally downwardly bendable from the hollow and rectangular-shaped top panel 26, with the uppermost longitudinal side of the right side panel pair of parallel and spaced-apart longitudinal sides 38 of the hollow and trapezoidal-shaped right side panel 36 being coincident with the right longitudinal side of the top panel pair of parallel and spaced-apart longitudinal sides 28 of the hollow and rectangular-shaped top panel 26, and with the right side panel rear lateral side 40 of the hollow and trapezoidal-shaped right side panel 36 being collinear with the rearmost lateral side of the top panel pair of parallel and spaced-apart lateral sides 30 of the hollow and rectangular-shaped top panel 26.

The pet flotation aid and walker 10 further includes a trapezoidal-shaped right belly flap 48 that has a right belly flap pair of parallel and spaced-apart longitudinal sides 50, a right belly flap rear lateral side 52 that is perpendicular to, and connects the rearmost ends of, the right belly flap pair of parallel and spaced-apart longitudinal sides 50 of the trapezoidal-shaped right belly flap 48, a right belly flap outer surface 54, and a right belly flap slightly skew front side 56 that slants slightly upwardly and forwardly from the forwardmost end of the lowermost longitudinal side of the right belly flap pair of parallel and spaced-apart longitudinal sides 50 of the trapezoidal-shaped right belly flap 48 to the forwardmost end of the uppermost longitudinal side of the right belly flap pair of parallel and spaced-apart longitudinal sides 50 of the trapezoidal-shaped right belly flap 48.

As shown in FIG. 5, which is a diagrammatic perspective view of the present invention shown generally in the operating orientation, the trapezoidal-shaped right belly flap 48 is generally inwardly bendable from the hollow and trapezoidal-shaped right side panel 36, with the uppermost longitudinal side of the right belly flap pair of parallel and spaced-apart longitudinal sides 50 of the trapezoidal-shaped right belly flap 48 being coincident with the lowermost longitudinal side of the right side panel pair of parallel and spaced-apart longitudinal sides 38 of the hollow and trapezoidal-shaped right side panel 36, with the right belly flap rear lateral side 52 of the trapezoidal-shaped right belly flap 48 being collinear with the right side panel rear lateral side 40 of the hollow and trapezoidal-shaped right side panel 36, and with the right belly flap slightly skew front side 56 of the trapezoidal-shaped right belly flap 48 being generally collinear with the right side panel slightly skew front side 46 of the hollow and trapezoidal-shaped right side panel 36.

The pet flotation aid and walker 10 further includes a generally concavo-convex-shaped right neck flap 58 that has a right neck flap concave-shaped side 60, a right neck flap convex-shaped side 62 that is spaced below, and generally parallel to, the right neck flap concave-shaped side 60 of the generally concavo-convex-shaped right neck flap 58, a right neck flap slightly skew rear lateral side 64 that connects the rearmost ends of the right neck flap convex-shaped side 62 of the generally concavo-convex-shaped right neck flap 58 and the right neck flap concave-shaped side 60 of the generally concavo-convex-shaped right neck flap 58, a right neck flap slightly skew front lateral side 66 that connects the forwardmost ends of the right neck flap convex-shaped side 62 of the generally concavo-convex-shaped right neck flap 58 and the right neck flap concave-shaped side 60 of the generally concavo-convex-shaped right neck flap 58 and which is shorter than, and oppositely slanted from, the right neck flap slightly skew rear lateral side 64 of the generally concavo-convex-shaped right neck flap 58, a right neck flap outer surface 68, a right neck flap inner surface 70, and a right neck flap substantially correspondingly shaped piece of internal foam floatation material 72 that is contained in, and generally fills, at least a part of the generally concavo-convex-shaped right neck flap 58.

As shown in FIGS. 5 and 6, which are a diagrammatic perspective view of the present invention shown generally in the operating orientation, and a diagrammatic perspective view of the area generally enclosed by the dotted circle identified generally by arrow 6 in FIG. 5, respectively, the generally concavo-convex-shaped right neck flap 58 is generally inwardly bendable from the hollow and trapezoidal-shaped right side panel 36, with the right neck flap slightly skew rear lateral side 64 of the generally concavo-convex-shaped right neck flap 58 being coincident with right side panel slightly skew front side 46 of the hollow and trapezoidal-shaped right side panel 36, with the right neck flap concave-shaped side 60 of the generally concavo-convex-shaped right neck flap 58 extending smoothly into the forwardmost lateral side of the top panel pair of parallel and spaced-apart lateral sides 30 of the hollow and rectangular-shaped top panel 26, and with the right neck flap convex-shaped side 62 of the generally concavo-convex-shaped right neck flap 58 extending smoothly in a small concave arc into the right belly flap slightly skew front side 56 of the trapezoidal-shaped right belly flap 48.

The pet flotation aid and walker 10 further includes a hollow and trapezoidal-shaped left side panel 74 that has a left side panel pair of parallel and spaced-apart longitudinal sides 76, a left side panel rear lateral side 78 that is perpendicular to, and connects, the rearmost ends of the left side panel pair of parallel and spaced-apart longitudinal sides 76 of the hollow and trapezoidal-shaped left side panel 74, a left side panel outer surface 80, a left side panel substantially correspondingly shaped piece of internal foam floatation material 82 that is contained in, and generally fills, the hollow and trapezoidal-shaped left side panel 74, and a left side panel slightly skew front side 84 that slants slightly upwardly and forwardly from the forwardmost end of the lowermost longitudinal side of the left side panel pair of parallel and spaced-apart longitudinal sides 76 of the hollow and trapezoidal-shaped left side panel 74 to the forwardmost end of the uppermost longitudinal side of the left side panel pair of parallel and spaced-apart longitudinal sides 76 of the hollow and trapezoidal-shaped left side panel 74.

As shown in FIG. 5, which is a diagrammatic perspective view of the present invention shown generally in the operating orientation, the hollow and trapezoidal-shaped left side panel 74 is generally downwardly bendable from the hollow and rectangular-shaped top panel 26, with the uppermost longitudinal side of the left side panel pair of parallel and spaced-apart longitudinal sides 76 of the hollow and trapezoidal-shaped left side panel 74 being coincident with the left longitudinal side of the top panel pair of parallel and spaced-apart longitudinal sides 28 of the hollow and rectangular-shaped top panel 26, and with the left side panel rear lateral side 78 of the hollow and trapezoidal-shaped left side panel 74 being collinear with the rearmost lateral side of the top panel pair of parallel and spaced-apart lateral sides 30 of the hollow and rectangular-shaped top panel 26.

The pet flotation aid and walker 10 further includes a trapezoidal-shaped left belly flap 86 that has a left belly flap pair of parallel and spaced-apart longitudinal sides 88, a left belly flap rear lateral side 90 that is perpendicular to, and connects the rearmost ends of, the left belly flap pair of parallel and spaced-apart longitudinal sides 88 of the trapezoidal-shaped left belly flap 86, and a left belly flap slightly skew front side 92 that slants slightly upwardly and forwardly from the forwardmost end of the lowermost longitudinal side of the left belly flap pair of parallel and spaced-apart longitudinal sides 88 of the trapezoidal-shaped left belly flap 86 to the forwardmost end of the uppermost longitudinal side of the left belly flap pair of parallel and spaced-apart longitudinal sides 88 of the trapezoidal-shaped left belly flap 86.

As shown in FIG. 5, which is a diagrammatic perspective view of the present invention shown generally in the operating orientation, the trapezoidal-shaped left belly flap 86 is generally inwardly bendable from the hollow and trapezoidal-shaped left side panel 74, with the uppermost longitudinal side of the left belly flap pair of parallel and spaced-apart longitudinal sides 88 of the trapezoidal-shaped left belly flap 86 being coincident with the lowermost longitudinal side of the left side panel pair of parallel and spaced-apart longitudinal sides 76 of the hollow and trapezoidal-shaped left side panel 74, with the left belly flap rear lateral side 90 of the trapezoidal-shaped left belly flap 86 being collinear with the left side panel rear lateral side 78 of the hollow and trapezoidal-shaped left side panel 74, and with the left belly flap slightly skew front side 92 of the trapezoidal-shaped left belly flap 86 being generally collinear with the left side panel slightly skew front side 84 of the hollow and trapezoidal-shaped left side panel 74.

The pet flotation aid and walker 10 further includes a generally concavo-convex-shaped left neck flap 94 that has a left neck flap concave-shaped side 96, a left neck flap convex-shaped side 98 that is spaced below, and generally parallel to, the left neck flap concave-shaped side 96 of the generally concavo-convex-shaped left neck flap 94, a left neck flap slightly skew rear lateral side 100 that connects the rearmost ends of the left neck flap convex-shaped side 98 of the generally concavo-convex-shaped left neck flap 94 and the left neck flap concave-shaped side 96 of the generally concavo-convex-shaped left neck flap 94, a left neck flap slightly skew front lateral side 102 that connects the forwardmost ends of the left neck flap convex-shaped side 98 of the generally concavo-convex-shaped left neck flap 94 and the left neck flap concave-shaped side 96 of the generally concavo-convex-shaped left neck flap 94 and which is shorter than, and oppositely slanted from, the left neck flap slightly skew rear lateral side 100 of the generally concavo-convex-shaped left neck flap 94, a left neck flap outer surface 104, and a left neck flap substantially correspondingly shaped piece of internal foam floatation material 106 that is contained in, and generally fills, at least a park of the generally concavo-convex-shaped left neck flap 94.

As shown in FIGS. 5 and 6, which are a diagrammatic perspective view of the present invention shown generally in the operating orientation, and a diagrammatic perspective view of the area generally enclosed by the dotted circle identified generally by arrow 6 in FIG. 5, respectively, the generally concavo-convex-shaped left neck flap 94 is generally inwardly bendable from the hollow and trapezoidal-shaped left side panel 74, with the left neck flap slightly skew rear lateral side 100 of the generally concavo-convex-shaped left neck flap 94 being coincident with left side panel slightly skew front side 84 of the hollow and trapezoidal-shaped left side panel 74, with the left neck flap concave-shaped side 96 of the generally concavo-convex-shaped left neck flap 94 extending smoothly into the forwardmost lateral side of the top panel pair of parallel and spaced-apart lateral sides 30 of the hollow and rectangular-shaped top panel 26, and with the left neck flap convex-shaped side 98 of the generally concavo-convex-shaped left neck flap 94 extending smoothly in a small concave arc into the left belly flap slightly skew front side 92 of the trapezoidal-shaped left belly flap 86.

The pet flotation aid and walker 10 further includes a first continuous, light-reflective, and adjustable belly strap 108 that has a first belly strap fixed proximal end 110 that is fixedly attached by stitching to the left side panel outer surface 80 of the hollow and trapezoidal-shaped left side panel 74, at the substantial midpoint between the left side panel pair of parallel and spaced-apart longitudinal sides 76 of the hollow and trapezoidal-shaped left side panel 74, and in proximity to the left side panel rear lateral side 78 of the hollow and trapezoidal-shaped left side panel 74.

The first continuous, light-reflective, and adjustable belly strap 108 extends along, and is fixedly attached by stitching to, the left side panel outer surface 80 of the hollow and trapezoidal-shaped left side panel 74, in proximity of, and parallel to, the left side panel rear lateral side 78 of the hollow and trapezoidal-shaped left side panel 74.

The first continuous, light-reflective, and adjustable belly strap 108 continues to extend along, and is fixedly attached by stitching to, the top panel outer surface 32 of the hollow and rectangular-shaped top panel 26, in proximity of, and parallel to, the rearmost lateral side of the top panel pair of parallel and spaced-apart lateral sides 30 of the hollow and rectangular-shaped top panel 26.

The first continuous, light-reflective, and adjustable belly strap 108 continues to extend along, and is fixedly attached by stitching to, the right side panel outer surface 42 of the hollow and trapezoidal-shaped right side panel 36, in proximity of, and parallel to, the right side panel rear lateral side 40 of the hollow and trapezoidal-shaped right side panel 36.

The first continuous, light-reflective, and adjustable belly strap 108 continues to extend along, and is fixedly attached by stitching to, the right belly flap outer surface 54 of the trapezoidal-shaped right belly flap 48, in proximity of, and parallel to, the right belly flap rear lateral side 52 of the trapezoidal-shaped right belly flap 48, and which terminates freely past the lowermost longitudinal side of the right belly flap pair of parallel and spaced-apart longitudinal sides 50 of the trapezoidal-shaped right belly flap 48, in a first belly strap free distal end 112.

The pet flotation aid and walker 10 further includes a first belly strap proximal end easy release buckle female portion 114 that is disposed in a stitched loop formed by the first belly strap fixed proximal end 110 of the first continuous, light-reflective, and adjustable belly strap 108.

The pet flotation aid and walker 10 further includes a first belly strap free distal end easy release buckle male portion 116 that is adjustably attached to the first belly strap free distal end 112 of the first continuous, light-reflective, and adjustable belly strap 108, and which is releasibly engagable with the first belly strap proximal end easy release buckle female portion 114.

The pet flotation aid and walker 10 further includes a second continuous, light-reflective, and adjustable belly strap 118 that is parallel to, and disposed forward of, the first continuous, light-reflective, and adjustable belly strap 108.

The second continuous, light-reflective, and adjustable belly strap 118 has a second belly strap fixed proximal end 120 that is fixedly attached by stitching to the left side panel outer surface 80 of the hollow and trapezoidal-shaped left side panel 74, at the substantial midpoint between the left side panel pair of parallel and spaced-apart longitudinal sides 76 of the hollow and trapezoidal-shaped left side panel 74, and in proximity to the left side panel slightly skew front side 84 of the hollow and trapezoidal-shaped left side panel 74.

The second continuous, light-reflective, and adjustable belly strap 118 extends along, and is fixedly attached by stitching to, the left side panel outer surface 80 of the hollow and trapezoidal-shaped left side panel 74, in proximity to the left side panel slightly skew front side 84 of the hollow and trapezoidal-shaped left side panel 74.

The second continuous, light-reflective, and adjustable belly strap 118 continues to extend along, and is fixedly attached by stitching to, the top panel outer surface 32 of the hollow and rectangular-shaped top panel 26, in proximity of, and parallel to, the forwardmost lateral side of the top panel pair of parallel and spaced-apart lateral sides 30 of the hollow and rectangular-shaped top panel 26.

The second continuous, light-reflective, and adjustable belly strap 118 continues to extend along, and is fixedly attached by stitching to, the right side panel outer surface 42 of the hollow and trapezoidal-shaped right side panel 36, in proximity of the right side panel slightly skew front side 46 of the hollow and trapezoidal-shaped right side panel 36.

The second continuous, light-reflective, and adjustable belly strap 118 continues to extend along, and is fixedly attached by stitching to, the right belly flap outer surface 54 of the trapezoidal-shaped right belly flap 48, in proximity of the right belly flap slightly skew front side 56 of the trapezoidal-shaped right belly flap 48, and which terminates freely past the lowermost longitudinal side of the right belly flap pair of parallel and spaced-apart longitudinal sides 50 of the trapezoidal-shaped right belly flap 48, in a second belly strap free distal end 122.

The pet flotation aid and walker 10 further includes a second belly strap proximal end easy release buckle female portion 124 that is disposed in a stitched loop formed by the second belly strap fixed proximal end 120 of the second continuous, light-reflective, and adjustable belly strap 118.

The pet flotation aid and walker 10 further includes a second belly strap free distal end easy release buckle male portion 125 that is adjustably attached to the second belly strap free distal end 122 of the second continuous, light-reflective, and adjustable belly strap 118, and which is releasibly engagable with the second belly strap proximal end easy release buckle female portion 124.

The pet flotation aid and walker 10 further includes a rectangular-shaped logo patch 126 that is fixedly attached by stitching to the left side panel outer surface 80 of the hollow and trapezoidal-shaped left side panel 74, and which extends from the second continuous, light-reflective, and adjustable belly strap 118 to the first continuous, light-reflective, and adjustable belly strap 108, and from the first belly strap fixed proximal end 110 of the first continuous, light-reflective, and adjustable belly strap 108 and the second belly strap fixed proximal end 120 of the second continuous, light-reflective, and adjustable belly strap 118 to the proximity of the left longitudinal side of the top panel pair of parallel and spaced-apart longitudinal sides 28 of the hollow and rectangular-shaped top panel 26.

The rectangular-shaped logo patch 126 bears the logo "Pet Passport" (not shown), which is silk-screened thereon, and which is easily readable when the pet flotation aid and walker 10 is donned on the pet 12.

The pet flotation aid and walker 10 further includes a rectangular-shaped, self-draining, and nylon mesh pocket 128 that is expandable on its lower side, and which is fixedly attached by stitching on three sides thereof to the right side panel outer surface 42 of the hollow and trapezoidal-shaped right side panel 36, and which extends from the second continuous, light-reflective, and adjustable belly strap 118 to the first continuous, light-reflective, and adjustable belly strap 108, and from the lowermost longitudinal side of the right side panel pair of parallel and spaced-apart longitudinal sides 38 of the hollow and trapezoidal-shaped right side panel 36 to the proximity of the right longitudinal side of the top panel pair of parallel and spaced-apart longitudinal sides 28 of the hollow and rectangular-shaped top panel 26, where it is open.

The rectangular-shaped, self-draining, and nylon mesh pocket 128 can be used to store the light-reflective leash 22 and any other pet or personal items that are deemed appropriate by the pet owner.

The open top of the rectangular-shaped, self-draining, and nylon mesh pocket 128 is closable by pocket closing hook and loop fasteners (VELCRO(™)) 130 that are disposed on the inner surface of the open top of the rectangular-shaped, self-draining, and nylon mesh pocket 128 and on a corresponding position on the right side panel outer surface 42 of the hollow and trapezoidal-shaped right side panel 36.

The pet flotation aid and walker 10 further includes a continuous and light-reflective grab handle 132 that is disposed on the top panel outer surface 32 of the hollow and rectangular-shaped top panel 26, between, and parallel to, the top panel pair of parallel and spaced-apart longitudinal sides 28 of the hollow and rectangular-shaped top panel 26, and which extends freely from the rearmost lateral side of the top panel pair of parallel and spaced-apart lateral sides 30 of the hollow and rectangular-shaped top panel 26, where it is fixedly attached by stitching, to the forwardmost lateral side of the top panel pair of parallel and spaced-apart lateral sides 30 of the hollow and rectangular-shaped top panel 26, where it is fixedly attached by stitching, and where it forms a loop that houses a D-shaped leash ring 134 that is replaceably engagable by the light-reflective leash 22.

The continuous and light-reflective grab handle 132 allows the pet owner to safely, quickly and easily raise or lower their pet from a dock to a boat, and/or a boat to a dock, and/or boat to a tender (dinghy), and/or a tender to a boat, and/or out of/into the water. This can be accomplished in a variety of ways. For example, one person may hand the pet up or down to another waiting person. Another example, a boat's halyard can be used for lifting larger pets. Still another example, one person may actually carry the pet as they, for example, climb up or down a boarding ladder.

The pet flotation aid and walker 10 further includes a right neck flap inner surface attaching hook and loop fasteners (VELCRO(™)) hook portion 136 that is disposed on the right neck flap inner surface 70 of the generally concavo-convex-shaped right neck flap 58, in proximity of the right neck flap slightly skew front lateral side 66 of the generally concavo-convex-shaped right neck flap 58.

The pet flotation aid and walker 10 further includes a left neck flap outer surface attaching hook and loop fasteners (VELCRO(™)) loop portion 138 that is disposed on the left neck outer surface 104 of the generally concavo-convex-shaped left neck flap 94, in proximity of the left neck flap slightly skew front lateral side 102 of the generally concavo-convex-shaped left neck flap 94, and which is releasibly engagable with the right neck flap inner surface attaching hook and loop fasteners (VELCRO(™)) hook portion 136 on the right neck flap inner surface 70 of the generally concavo-convex-shaped right neck flap 58.

The pet flotation aid and walker 10 further includes a left neck flap outer surface continuous and light-reflective short strap 140 that is disposed on the left neck outer surface 104 of the generally concavo-convex-shaped left neck flap 94, and which extends freely from the substantial midpoint between the left neck flap slightly skew rear lateral side 100 of the generally concavo-convex-shaped left neck flap 94 and the left neck flap outer surface attaching hook and loop fasteners (VELCRO(™)) loop portion 138 on the left neck outer surface 104 of the generally concavo-convex-shaped left neck flap 94, where it is fixedly attached by stitching, to a length short of the left neck flap outer surface attaching hook and loop fasteners (VELCRO(™)) loop portion 138 on the left neck outer surface 104 of the generally concavo-convex-shaped left neck flap 94, where it terminates freely.

The pet flotation aid and walker 10 further includes a left neck strap free terminal end easy release buckle female portion 142 that is disposed in a stitched loop formed at the terminal free end of the left neck flap outer surface continuous and light-reflective short strap 140 on the left neck outer surface 104 of the generally concavo-convex-shaped left neck flap 94.

The pet flotation aid and walker 10 further includes a right neck flap outer surface continuous and light-reflective long strap 144 that is disposed on the right neck outer surface 68 of the generally concavo-convex-shaped right neck flap 58, and which is longer than the left neck flap outer surface continuous and light-reflective short strap 140 on the left neck outer surface 104 of the generally concavo-convex-shaped left neck flap 94.

The right neck flap outer surface continuous and light-reflective long strap 144 on the right neck outer surface 68 of the generally concavo-convex-shaped right neck flap 58 extends freely from the substantial midpoint between the right neck flap slightly skew rear lateral side 64 of the generally concavo-convex-shaped right neck flap 58 and the right neck flap inner surface attaching hook and loop fasteners (VELCRO(™)) hook portion 136 on the left neck flap inner surface 70 of the generally concavo-convex-shaped right neck flap 58, where it is fixedly attached by stitching, to a length past the right neck flap slightly skew front lateral side 66 of the generally concavo-convex-shaped right neck flap 58, where it terminates freely.

The pet flotation aid and walker 10 further includes a right neck strap free terminal end easy release buckle male portion 146 that is adjustably attached to the terminal free end of the right neck flap outer surface continuous and light-reflective long strap 144 on the right neck outer surface 68 of the generally concavo-convex-shaped right neck flap 58, and which is releasibly engagable with the left neck strap free terminal end easy release buckle female portion 142.

Each of the light-reflective leash 22; the first continuous, light-reflective, and adjustable belly strap 108;, the second continuous, light-reflective, and adjustable belly strap 118; the left neck flap outer surface continuous and light-reflective short strap 140; and the right neck flap outer surface continuous and light-reflective long strap 144 is a 1" wide strip of nylon or polypropylene webbing having interwoven along the longitudinally centerline thereof, three continuous, parallel, and closely spaced-apart strands of reflective material 148 that yields 500 candle-power when shined upon.

The three continuous, parallel, and closely spaced-apart strands of reflective material 148 enable the pet owner, by using a spotlight, a flashlight, or a headlight, to quickly and easily identify the pet at night while the pet is in the water, on the land, or being walked.

The pet flotation aid and walker 10 may also further include an optional second hook and loop fastener (VELCRO(™)) styled compartment/pouch (not shown) to hold personal belongs of the pet owner.

The pet flotation aid and walker 10 may also further include an optional third hook and loop fastener (VELCRO(™)) styled compartment/pouch (not shown) to hold the pet's ID tag.

The method of donning the pet flotation aid and walker 10 can best be seen in FIGS. 1, 5, and 6, which are a diagrammatic perspective view of the present invention installed on a pet, a diagrammatic perspective view of the present invention shown generally in the operating orientation, and a diagrammatic perspective view of the area generally enclosed by the dotted circle identified generally by arrow 6 in FIG. 5, respectively, and as such will be discussed with reference thereto.

The hollow and rectangular-shaped top panel 26 is placed on, and in abutment with, the pet back 14 of the pet 12, with the hollow and trapezoidal-shaped right side panel 36 and the hollow and trapezoidal-shaped left side panel 74 bending downwardly along, and in abutment with, the pet body sides 16 of the pet 12, and with the generally concavo-convex-shaped right neck flap 58 and the generally concavo-convex-shaped left neck flap 94 extending forwardly.

It is to be understood that the right side panel slightly skew front side 46 of the hollow and trapezoidal-shaped right side panel 36 and the left side panel slightly skew front side 84 of the hollow and trapezoidal-shaped left side panel 74 provide boundaries that are generally complementary to, and do not generally obstruct movement of, the shoulders of the pet 12, by slanting rearwardly and downwardly from the back of the pet neck 20 of the pet 12 to the backs of the front legs of the pet 12, so that the front legs of the pet 12 can clearly move without any significant obstruction thereto since the backs of the front legs of the pet 12 are disposed behind the back of the pet neck 20 of the pet 12.

The trapezoidal-shaped left belly flap 86 is bent inwardly along, and in abutment with, the pet belly 18 of the pet 12.

The trapezoidal-shaped right belly flap 48 is bent inwardly overlappingly, and in smooth abutment with, the trapezoidal-shaped left belly flap 86.

The first continuous, light-reflective, and adjustable belly strap 108 is extended over the trapezoidal-shaped left belly flap 86.

The properly adjusted first belly strap free distal end easy release buckle male portion 116 of the first continuous, light-reflective, and adjustable belly strap 108 is releasibly engaged with the first belly strap proximal end easy release buckle female portion 114 of the first continuous, light-reflective, and adjustable belly strap 108.

The second continuous, light-reflective, and adjustable belly strap 118 is extended over the trapezoidal-shaped left belly flap 86.

The properly adjusted second belly strap free distal end easy release buckle male portion 125 of the second continuous, light-reflective, and adjustable belly strap 118 is releasibly engaged with the second belly strap proximal end easy release buckle female portion 124 of the second continuous, light-reflective, and adjustable belly strap 118, so that the pet flotation aid and walker 10 is now securely donned around the pet back 14 of the pet 12, the pet body sides 16 of the pet 12, and the pet belly 18 of the pet 12.

It is to be understood that the overlapping of the trapezoidal-shaped right belly flap 48 on the trapezoidal-shaped left belly flap 86 prevents the second continuous, light-reflective, and adjustable belly strap 118 and the first continuous, light-reflective, and adjustable belly strap 108 from digging into the pet belly 18 of the pet 12 when lifted and thereby providing comfort for the pet 12, while the wide width of the trapezoidal-shaped right belly flap 48 and the wide width of the trapezoidal-shaped left belly flap 86 distribute the weight of the pet 12, especially in heavy pets, over a greater area of the pet belly 18 of the pet 12 when the pet 12 is lifted and thereby minimizing transfer of the load to the pet belly 18 of the pet 12, so that further comfort is provided for the pet 12.

It is to be further understood that the right belly flap slightly skew front side 56 of the trapezoidal-shaped right belly flap 48 and the left belly flap slightly skew front side 92 of the trapezoidal-shaped left belly flap 86 provide general clearance of, and less transferred load to, the diaphragm of the thoracic cage of the pet 12 and thereby allowing easier breathing for the pet 12 when the pet 12 is lifted, so that additional comfort is provided for the pet 12.

The generally concavo-convex-shaped left neck flap 94 is bent inwardly along, and in abutment with, the pet neck 20 of the pet 12 and the pet chest 21 of the pet 12.

The generally concavo-convex-shaped right neck flap 58 is bent inwardly overlappingly, and in smooth abutment with, the generally concavo-convex-shaped left neck flap 94, with the right neck flap inner surface attaching hook and loop fasteners (VELCRO(™)) hook portion 136 on the right neck flap inner surface 70 of the generally concavo-convex-shaped right neck flap 58 releasibly engaging the left neck flap outer surface attaching hook and loop fasteners (VELCRO(™)) loop portion 138 on the left neck outer surface 104 of the generally concavo-convex-shaped left neck flap 94.

It is to be understood that the right neck flap concave-shaped side 60 of the generally concavo-convex-shaped right neck flap 58 and the left neck flap concave-shaped side 96 of the generally concavo-convex-shaped left neck flap 94 provide boundaries that clear the throat of the pet 12, so that the pet can breath comfortably.

It is to be further understood that the right neck flap convex-shaped side 62 of the generally concavo-convex-shaped right neck flap 58 and the left neck flap convex-shaped side 98 of the generally concavo-convex-shaped left neck flap 94 provide boundaries that clear the pet chest 21 of the pet 12, so that the pet 12 can breath even more comfortably.

It is to be still further understood that the small concave arc of the right neck flap convex-shaped side 62 of the generally concavo-convex-shaped right neck flap 58 and the small concave arc of the left neck flap convex-shaped side 92 of the generally concavo-convex-shaped left neck flap 94 provide boundaries that are generally complementary to, and do not generally obstruct movement of, the shoulder structures of the pet 12, so that the front legs of the pet 12 can clearly move without any significant obstruction thereto.

The right neck flap outer surface continuous and light-reflective long strap 144 of the generally concavo-convex-shaped right neck flap 58 is extended over the generally concavo-convex-shaped left neck flap 94.

The properly adjusted right neck strap free terminal end easy release buckle male portion 146 of the generally concavo-convex-shaped right neck flap 58 is releasibly engaged with the left neck strap free terminal end easy release buckle female portion 142 of the generally concavo-convex-shaped left neck flap 94, so that the pet flotation aid and walker 10 is now securely donned around the pet neck 20 of the pet 12 and the pet chest 21 of the pet 12 and thereby now completely securely donned on the pet 12.

It is to be understood the overlapping of the generally concavo-convex-shaped right neck flap 58 on the generally concavo-convex-shaped left neck flap 94 not only prevents the right neck flap outer surface continuous and light-reflective long strap 144 of the generally concavo-convex-shaped right neck flap 58 from digging into the pet chest 21 of the pet 12 and the pet neck 20 of the pet 12, but also allows adjustment for pets with different sized necks, especially the expansion necessary for pets with large necks.

It is to be further understood that since the generally concavo-convex-shaped right neck flap 58 is separate and detachable from the generally concavo-convex-shaped left neck flap 94, the pet flotation aid and walker 10 can be easily removed from the pet chest 21 of the pet 12, especially when the pet 12 is large.

It is to be still further understood that the engagement of the right neck flap inner surface attaching hook and loop fasteners (VELCRO(™)) hook portion 136 on the right neck flap inner surface 70 of the generally concavo-convex-shaped right neck flap 58 with the left neck flap outer surface attaching hook and loop fasteners (VELCRO(™)) loop portion 138 on the left neck outer surface 104 of the generally concavo-convex-shaped left neck flap 94 eliminates relative shifting between the generally concavo-convex-shaped right neck flap 58 and the generally concavo-convex-shaped left neck flap 94 and thereby preventing crimping between the generally concavo-convex-shaped right neck flap and the generally concavo-convex-shaped left neck flap 94 that could dig into the pet chest 21 of the pet 12 and the pet neck 20 of the pet 12, so that additional comfort is provided for the pet 12.

It is apparent that the engagement of the right neck flap inner surface attaching hook and loop fasteners (VELCRO(™)) hook portion 136 on the right neck flap inner surface 70 of the generally concavo-convex-shaped right neck flap 58 with the left neck flap outer surface attaching hook and loop fasteners (VELCRO(™)) loop portion 138 on the left neck outer surface 104 of the generally concavo-convex-shaped left neck flap 94 is double functional. It not only eliminates relative shifting, and thereby a more secure and safe link, between the generally concavo-convex-shaped right neck flap 58 and the generally concavo-convex-shaped left neck flap 94, but it also provides an additional securement between the generally concavo-convex-shaped right neck flap 58 and the generally concavo-convex-shaped left neck flap 94.

It is further apparent that the pet flotation aid and walker 10 can be attached to, and removed from, the pet 12 extremely quickly without bother, by simply fastening or unfastening only three buckles, namely, the first belly strap free distal end easy release buckle male portion 116 of the first continuous, light-reflective, and adjustable belly strap 108, the second belly strap free distal end easy release buckle male portion 125 of the second continuous, light-reflective, and adjustable belly strap 118, and the right neck strap free terminal end easy release buckle male portion 146 of the generally concavo-convex-shaped right neck flap 58.

In contradistinction, however, the prior art devices make it necessary for the owner to lift the pet and/or move the pet's front legs during the attachment of removal process. Further, the prior art devices require the owner to repeatedly "feed" the attachment/removal buckles through material loops every time the device is attached or removed.

It is to be understood that the configurations of the various components of the present invention are not merely a matter of design choice but awe significant and of critical importance for, inter alia, the functions that they accomplish as discussed, supra, and any not explicitly expressed but inherent thereto. They therefore must be considered in determining patentability. Support for this assertion can be found in In re Dailey et al., 149 U.S.P.Q. 47 (CCPA 1976), where the Court held that the shape of a device must be considered in determining patentability, if the shape is significant:

"... the configuration of the container is a 'mere matter of choice' not significantly novel . . . , [since] . . . Appellants have provided no argument which convinces us that the particular configuration of their container is significant . . . "[Emphasis added]

It will be understood that each of the elements described above, or two or more together, may also find a useful application in other types of constructions differing from the types described above.

While the invention has been illustrated and described as embodied in a pet flotation aid and walker, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A pet flotation aid and walker attachable to a pet, wherein the pet has weight, a back, a right side, a left side, a belly, a neck with a back, a chest with an expanding portion, a right shoulder, a left shoulder, a throat, a diaphragm, a thoracic cage, a right front leg with a back, and a left front leg with a back, comprising:

a) a hollow and rectangular-shaped top panel being positionable on the back of the pet and having a pair of parallel and spaced-apart longitudinal sides with ends, a pair of parallel and spaced-apart lateral sides being perpendicular to, and connecting said ends of, said pair of parallel and spaced-apart longitudinal sides of said hollow and rectangular-shaped top panel, and an outer surface;

b) a first piece of internal foam floatation material being contained in, and generally filling, at least a portion of said hollow and rectangular-shaped top panel;

c) a hollow and trapezoidal-shaped right side panel being generally downwardly bendable from said hollow and rectangular-shaped top panel and being positionable on the right side of the pet; said hollow and trapezoidal-shaped right side panel having a pair of parallel and spaced-apart longitudinal sides with rearmost ends and forwardmost ends, a rear lateral side being perpendicular to, and connecting, said rearmost ends of said pair of parallel and spaced-apart longitudinal sides of said hollow and trapezoidal-shaped right side panel, an outer surface, and a slightly skew front side slanting slightly upwardly and forwardly from said forwardmost end of a lowermost longitudinal side of said pair of parallel and spaced-apart longitudinal sides of said hollow and trapezoidal-shaped right side panel to said forwardmost end of an uppermost longitudinal side of said pair of parallel and spaced-apart longitudinal sides of said hollow and trapezoidal-shaped right side panel;

d) a second piece of internal foam floatation material being contained in, and generally filling, at least a portion of said hollow and trapezoidal-shaped right side panel;

e) a trapezoidal-shaped and wide right belly flap being generally inwardly bendable from said hollow and trapezoidal-shaped right side panel and being positionable on the belly of the pet; said trapezoidal-shaped and wide right belly flap having a wide width, a pair of parallel and spaced-apart longitudinal sides with forwardmost ends and rearmost ends, a rear lateral side being perpendicular to, and connecting, said rearmost ends of said pair of parallel and spaced-apart longitudinal sides of said trapezoidal-shaped and wide right belly flap, an outer surface, and a slightly skew front side slanting slightly upwardly and forwardly from said forwardmost end of a lowermost longitudinal side of said pair of parallel and spaced-apart longitudinal sides of said trapezoidal-shaped and wide right belly flap to said forwardmost end of an uppermost longitudinal side of said pair of parallel and spaced-apart longitudinal sides of said trapezoidal-shaped and wide right belly flap;

f) a generally concavo-convex-shaped right neck flap being generally inwardly bendable from said hollow and trapezoidal-shaped right side panel and being positionable on the neck of the pet and the chest of the pet; said generally concavo-convex-shaped right neck flap having a concave-shaped side with a forwardmost end and a rearmost end, a convex-shaped side with a forwardmost end and a rearmost end and being spaced below, and generally parallel to, said concave-shaped side of said generally concavo-convex-shaped right neck flap, a slightly skew rear lateral side connecting said rearmost end of said convex-shaped side of said generally concavo-convex-shaped right neck flap to said rearmost end of said concave-shaped side of said generally concavo-convex-shaped right neck flap, a slightly skew front lateral side connecting said forwardmost end of said convex-shaped side of said generally concavo-convex-shaped right neck flap to said forwardmost end of said concave-shaped side of said generally concavo-convex-shaped right neck flap and being shorter than, and oppositely slanted from, said slightly skew rear lateral side of said generally concavo-convex-shaped right neck flap, an outer surface, and an inner surface;

g) a third piece of internal foam floatation material being contained in, and generally filling, at least a portion of said generally concavo-convex-shaped right neck flap;

h) a hollow and trapezoidal-shaped left side panel being generally downwardly bendable from said hollow and rectangular-shaped top panel and being positionable on the left side of the pet; said hollow and trapezoidal-shaped left side panel having a pair of parallel and spaced-apart longitudinal sides with rearmost ends and forwardmost ends, a rear lateral side being perpendicular to, and connecting, said rearmost ends of said pair of parallel and spaced-apart longitudinal sides of said hollow and trapezoidal-shaped left side panel, an outer surface, and a slightly skew front side slanting slightly upwardly and forwardly from said forwardmost end of a lowermost longitudinal side of said pair of parallel and spaced-apart longitudinal sides of said hollow and trapezoidal-shaped left side panel to said forwardmost end of an uppermost longitudinal side of said pair of parallel and spaced-apart longitudinal sides of said hollow and trapezoidal-shaped left side panel;

i) a fourth piece of internal foam floatation material being contained in, and generally filling, at least a portion of said hollow and trapezoidal-shaped left side panel;

j) a trapezoidal-shaped and wide left belly flap being generally inwardly bendable from said hollow and trapezoidal-shaped left side panel and being positionable on the belly of the pet; said trapezoidal-shaped and wide left belly flap having a wide width, a pair of parallel and spaced-apart longitudinal sides with forwardmost ends and rearmost ends, a rear lateral side being perpendicular to, and connecting said rearmost ends of, said pair of parallel and spaced-apart longitudinal sides of said trapezoidal-shaped and wide left belly flap, an outer surface, and a slightly skew front side slanting slightly upwardly and forwardly from said forwardmost end of a lowermost longitudinal side of said pair of parallel and spaced-apart longitudinal sides of said trapezoidal-shaped and wide left belly flap to said forwardmost end of an uppermost longitudinal side of said pair of parallel and spaced-apart longitudinal sides of said trapezoidal-shaped and wide left belly flap;

k) a generally concavo-convex-shaped left neck flap being generally inwardly bendable from said hollow and trapezoidal-shaped left side panel and being positionable on the neck of the pet and the chest of the pet; said generally concavo-convex-shaped left neck flap having a concave-shaped side with a forwardmost end and a rearmost end, a convex-shaped side with a forwardmost end and a rearmost end and being spaced below, and generally parallel to, said concave-shaped side of said generally concavo-convex-shaped left neck flap, a slightly skew rear lateral side connecting said rearmost end of said convex-shaped side of said generally concavo-convex-shaped left neck flap to said rearmost end of said concave-shaped side of said generally concavo-convex-shaped left neck flap, a slightly skew front lateral side connecting said forwardmost end of said convex-shaped side of said generally concavo-convex-shaped left neck flap to said forwardmost end of said concave-shaped side of said generally concavo-convex-shaped left neck flap and being shorter than, and oppositely slanted from, said slightly skew rear lateral side of said generally concavo-convex-shaped left neck flap, an outer surface, and a inner surface; said generally concavo-convex-shaped left neck flap being separate and detachable from said generally concavo-convex-shaped right neck flap, so that said pet flotation aid and walker can be easily removed from the chest of said pet without having to lift the pet, especially when the pet is large;

l) a fifth piece of internal foam floatation material being contained in, and generally filling, at least a portion of said generally concavo-convex-shaped left neck flap;

m) neck flap attaching means for releasibly attaching said generally concavo-convex-shaped right neck flap and said generally concavo-convex-shaped left neck flap to each other when said generally concavo-convex-shaped right neck flap and said generally concavo-convex-shaped left neck flap are positioned on the neck of the pet and the chest of the pet, so that said pet floatation aid and walker is releasibly secured around the neck of the pet and the chest of the pet;

n) a first continuous, light-reflective, and adjustable belly strap having a fixed proximal end and a free distal end and extending across said hollow and trapezoidal-shaped left side panel, said hollow and rectangular-shaped top panel, said hollow and trapezoidal-shaped right side panel, said trapezoidal-shaped and wide right belly flap, and being extendable across said trapezoidal-shaped and wide left belly flap;

o) first strap attaching means for releasibly attaching said fixed proximal end of said first continuous, light-reflective, and adjustable belly strap to said free distal end of said first continuous, light-reflective, and adjustable belly strap, so that another portion of said pet floatation aid and walker is releasibly secured around the back of the pet, the right side of the pet, the left side of the pet, and the belly of the pet;

p) a second continuous, light-reflective, and adjustable belly strap having a fixed proximal end and a free distal end and extending across said hollow and trapezoidal-shaped left side panel, said hollow and rectangular-shaped top panel, said hollow and trapezoidal-shaped right side panel, said trapezoidal-shaped and wide right belly flap, and being extendable across said trapezoidal-shaped wide and left belly flap; and q) second strap attaching means for releasibly attaching said fixed proximal end of said second continuous, light-reflective, and adjustable belly strap to said free distal end of said second continuous, light-reflective, and adjustable belly strap, so that a remaining portion of said pet floatation aid and walker is releasibly secured around the back of the pet, the right side of the pet, the left side of the pet, and the belly of the pet and thereby said pet floatation aid and walker is completely releasibly secured on the pet and can removed from the pet extremely quickly without bother, by simply unfastening said neck flap attaching means, said first strap attaching means, and said second strap attaching means.

2. The pet aid as defined in claim 1, wherein said uppermost longitudinal side of said pair of parallel and spaced-apart longitudinal sides of said hollow and trapezoidal-shaped right side panel is coincident with a right longitudinal side of said pair of parallel and spaced-apart longitudinal sides of said hollow and rectangular-shaped top panel; said rear lateral side of said hollow and trapezoidal-shaped right side panel is collinear with a rearmost lateral side of said pair of parallel and spaced-apart lateral sides of said hollow and rectangular-shaped top panel; said slightly skew front side of said hollow and trapezoidal-shaped right side panel provides a boundary that is generally complementary to, and generally unobstructive to movement of, the right shoulder of the pet as a result of slanting rearwardly and downwardly from the back of the neck of the pet to the back of the right front leg of the pet since the back of the right front leg of the pet is disposed behind the back of the neck of the pet, so that the right front leg of the pet can move without any significant obstruction thereto.

3. The pet aid as defined in claim 1, wherein said uppermost longitudinal side of said pair of parallel and spaced-apart longitudinal sides of said trapezoidal-shaped and wide right belly flap is coincident with said lowermost longitudinal side of said pair of parallel and spaced-apart longitudinal sides of said hollow and trapezoidal-shaped right side panel; said rear lateral side of said trapezoidal-shaped and wide right belly flap is collinear with said rear lateral side of said hollow and trapezoidal-shaped right side panel; said slightly skew front side of said trapezoidal-shaped and wide right belly flap is generally collinear with said slightly skew front side of said hollow and trapezoidal-shaped right side panel; said slightly skew front side of said trapezoidal-shaped and wide right belly flap provides general clearance of, and less transferred load to, the diaphragm in the thoracic cage of the pet and thereby allowing easier breathing for the pet when the pet is lifted, so that additional comfort is provided for the pet.

4. The pet aid as defined in claim 3, wherein said uppermost longitudinal side of said pair of parallel and spaced-apart longitudinal sides of said trapezoidal-shaped and wide left belly flap is coincident with said lowermost longitudinal side of said pair of parallel and spaced-apart longitudinal sides of said hollow and trapezoidal-shaped left side panel; said rear lateral side of said trapezoidal-shaped and wide left belly flap is collinear with said rear lateral side of said hollow and trapezoidal-shaped left side panel; said slightly skew front side of said trapezoidal-shaped and wide left belly flap is generally collinear with said slightly skew front side of said hollow and trapezoidal-shaped left side panel; said slightly skew from side of said trapezoidal-shaped and wide left belly flap provides general clearance of, and less transferred load to, the diaphragm in the thoracic cage of the pet and thereby allowing easier breathing for the pet when the pet is lifted, so that additional comfort is provided for the pet; said overlapping of said trapezoidal-shaped and wide right belly flap on said trapezoidal-shaped left belly flap prevents said second continuous, light-reflective, and adjustable belly strap, said second strap attaching means, said first continuous, light-reflective, and adjustable belly strap, and said first strap attaching means from digging into the belly of the pet when lifted, so that comfort is provided for the pet; said wide width of said trapezoidal-shaped and wide right belly flap and said wide width of said trapezoidal-shaped and wide left belly flap distribute the weight of the pet, especially in heavy pets, over a greater area of the belly of the pet when the pet is lifted, so that additional comfort is provided for the pet.

5. The pet aid as defined in claim 1, wherein said slightly skew rear lateral side of said generally concavo-convex-shaped right neck flap is coincident with said slightly skew front side of said hollow and trapezoidal-shaped right side panel; said concave-shaped side of said generally concavo-convex-shaped right neck flap extends smoothly into a forwardmost lateral side of said pair of parallel and spaced-apart lateral sides of said hollow and rectangular-shaped top panel; said convex-shaped side of said generally concavo-convex-shaped right neck flap extends smoothly, in a small concave arc, into said slightly skew front side of said trapezoidal-shaped and wide right belly flap; said concave-shaped side of said generally concavo-convex-shaped right neck flap provides a boundary that generally clears the throat of the pet, so that the pet can breath comfortably; said convex-shaped side of said generally concavo-convex-shaped right neck flap provides a boundary that generally clears the chest of the pet, so that the pet can breath even more comfortably; said small concave arc of said convex-shaped side of said generally concavo-convex-shaped right neck flap provides a boundary that is generally complementary to, and generally unobstructive of, the right shoulder of the pet, so that the right front leg of the pet can move without any significant obstruction thereto.

6. The pet aid as defined in claim 5, wherein said slightly skew rear lateral side of said generally concavo-convexshaped left neck flap is coincident with said slightly skew front side of said hollow and trapezoidal-shaped left side panel; said concave-shaped side of said generally concavo-convex-shaped left neck flap extends smoothly into a forwardmost lateral side of said pair of parallel and spaced-apart lateral sides of said hollow and rectangular-shaped top panel; said convex-shaped side of said generally concavo-convex-shaped left neck flap extends smoothly, in a small concave arc, into said slightly skew front side of said trapezoidal-shaped and wide left belly flap; said concave-shaped side of said generally concavo-convex-shaped left neck flap provides a boundary that generally clears the throat of the pet, so that the pet can breath comfortably; said convex-shaped side of said generally concavo-convex-shaped left neck flap provides a boundary that generally clears the chest of the pet, so that the pet can breath even more comfortably; said small concave arc of said convex-shaped side of said generally concavo-convex-shaped left neck flap provides a boundary that is generally complementary to, and generally unobstructive of, the left shoulder of the pet, so that the left front leg of the pet can move without any significant obstruction thereto.

7. The pet aid as defined in claim 6, wherein said neck flap attaching means includes hook and loop fasteners; one portion of said hook and loop fasteners of said neck flap attaching means is disposed on said inner surface of said generally concavo-convex-shaped right neck flap, in proximity to said slightly skew front lateral side of said generally concavo-convex-shaped right neck flap; a mating portion of said hook and loop fasteners of said neck flap attaching means is disposed on said outer surface of said generally concavo-convex-shaped left neck flap, in proximity to said slightly skew front lateral side of said generally concavo-convex-shaped left neck flap, and which is releasibly engagable with said one portion of said hook and loop fasteners of said neck flap attaching means so as to prevent relative shifting between said generally concavo-convex-shaped right neck flap and said generally concavo-convex-shaped left neck flap, so that crimping of at least one of said generally concavo-convex-shaped right neck flap and said generally concavo-convex-shaped left neck flap is prevented that could dig into the chest of the pet and the neck of the pet, especially pets with small necks when said overlapping is greater, and thereby providing additional comfort for the pet.

8. The pet aid as defined in claim 7, wherein said neck flap attaching means further includes a continuous and light-reflective short strap that is disposed on said outer surface of said generally concavo-convex-shaped left neck flap, and which extends freely from a substantial midpoint between said slightly skew rear lateral side of said generally concavo-convex-shaped left neck flap and said mating portion of said hook and loop fasteners of said neck flap attaching means, where said continuous and light-reflective short strap of said neck flap attaching means is fixedly attached by stitching, to a length short of said mating portion of said hook and loop fasteners of said neck flap attaching means, where said continuous and light-reflective short strap of said neck flap attaching means terminates freely in a terminal free end.

9. The pet aid as defined in claim 8, wherein said neck flap attaching means further includes an easy release buckle female portion that is disposed in a stitched loop formed at said terminal free end of said continuous and light-reflective short strap of said neck flap attaching means.

10. The pet aid as defined in claim 9, wherein said neck flap attaching means further includes a continuous and light-reflective long strap that is disposed on said outer surface of said generally concavo-convex-shaped right neck flap, and which is longer than said continuous and light-reflective short strap of said neck flap attaching means; said continuous and light-reflective long strap of said neck flap attaching means extends freely from a substantial midpoint between said slightly skew rear lateral side of said generally concavo-convex-shaped right neck flap and said one portion of said hook and loop fasteners of said neck flap attaching means, where said continuous and light-reflective long strap of said neck flap attaching means is fixedly attached by stitching, to a length past said slightly skew front lateral side of said generally concavo-convex-shaped right neck flap, where said continuous and light-reflective long strap of said neck flap attaching means terminates freely in a terminal free end.

11. The pet aid as defined in claim 10, wherein said neck flap attaching means further includes an easy release buckle male portion that is adjustably attached to said terminal free end of said continuous and light-reflective long strap of said neck flap attaching means, and which is releasibly engagable with said easy release buckle female portion of said neck flap attaching means; said overlapping of said generally concavo-convex-shaped right neck flap on said generally concavo-convex-shaped left neck flap prevents at least a part of said neck flap attaching means from digging into the chest of the pet and the neck of the pet and allows adjustments for pets with different sized necks, especially those with large necks, while providing an additional secure and sage link, between said generally concavo-convex-shaped right neck flap and said generally concavo-convex-shaped left neck flap.

12. The pet aid as defined in claim 10, wherein each of said first continuous, light-reflective, and adjustable belly strap, said second continuous, light-reflective, and adjustable belly strap, said continuous and light-reflective long strap of said neck flap attaching means, said continuous and light-reflective short strap of said neck flap attaching means, and a light-reflective leash is selected from the group consisting of nylon webbing and polypropylene webbing, and which has three continuous, parallel, and closely spaced-apart strands of reflective material that yields 500 candle-power when shined upon interwoven therethrough along a longitudinally centerline thereof, so that a pet owner, by using a light, can quickly and easily locate and identify the pet at night.

13. The pet aid as defined in claim 1, wherein said uppermost longitudinal side of said pair of parallel and spaced-apart longitudinal sides of said hollow and trapezoidal-shaped left side panel is coincident with a left longitudinal side of said pair of parallel and spaced-apart longitudinal sides of said hollow and rectangular-shaped top panel; said rear lateral side of said hollow and trapezoidal-shaped left side panel is collinear with a rearmost lateral side of said pair of parallel and spaced-apart lateral sides of said hollow and rectangular-shaped top panel; said slightly skew front side of said hollow and trapezoidal-shaped left side panel provides a boundary that is generally complementary to, and generally unobstructive to movement of, the left shoulder of the pet as a result of slanting rearwardly and downwardly from the back of the neck of the pet to the back of the left front leg of the pet since the back of the left front leg of the pet is disposed behind the back of the neck of the pet, so that the left front leg of the pet can move without any significant obstruction thereto.

14. The pet aid as defined in claim 1, wherein said fixed proximal end of said first continuous, light-reflective, and adjustable belly strap is fixedly attached, by stitching, to said outer surface of said hollow and trapezoidal-shaped left side panel, at a substantial midpoint between said pair of parallel and spaced-apart longitudinal sides of said hollow and trapezoidal-shaped left side panel, and in proximity to said rear lateral side of said hollow and trapezoidal-shaped left side panel.

15. The pet aid as defined in claim 14, wherein said first continuous, light-reflective, and adjustable belly strap extends along, and is fixedly attached by stitching to, said outer surface of said hollow and trapezoidal-shaped left side panel, in proximity of, and parallel to, said rear lateral side of said hollow and trapezoidal-shaped left side panel.

16. The pet aid as defined in claim 15, wherein said first continuous, light-reflective, and adjustable belly strap continues to extend along, and is fixedly attached by stitching to, said outer surface of said hollow and rectangular-shaped top panel, in proximity of, and parallel to, a rearmost lateral side of said pair of parallel and spaced-apart lateral sides of said hollow and rectangular-shaped top panel.

17. The pet aid as defined in claim 16, wherein said first continuous, light-reflective, and adjustable belly strap continues to extend along, and is fixedly attached by stitching to, said outer surface of said hollow and trapezoidal-shaped right side panel, in proximity of, and parallel to, said rear lateral side of said hollow and trapezoidal-shaped right side panel.

18. The pet aid as defined in claim 17, wherein said first continuous, light-reflective, and adjustable belly strap continues to extend along, and is fixedly attached by stitching to, said outer surface of said trapezoidal-shaped and wide right belly flap, in proximity of, and parallel to, said rear lateral side of said trapezoidal-shaped and wide right belly flap, and which terminates freely past said lowermost longitudinal side of said pair of parallel and spaced-apart longitudinal sides of said trapezoidal-shaped and wide right belly flap as said free distal end of said first continuous, light-reflective, and adjustable belly strap.

19. The pet aid as defined in claim 1, wherein said first strap attaching means includes an easy release buckle female portion that is disposed in a stitched loop formed by said fixed proximal end of said first continuous, light-reflective, and adjustable belly strap; said first strap attaching means further includes an easy release buckle male portion that is adjustably attached to said free distal end of said first continuous, light-reflective, and adjustable belly strap, and which is releasibly engagable with said easy release buckle female portion of said first strap attaching means.

20. The pet aid as defined in claim 1, wherein said second continuous, light-reflective, and adjustable belly strap is parallel to, and disposed forward of, said first continuous, light-reflective, and adjustable belly strap; said fixed proximal end of said second continuous, light-reflective, and adjustable belly strap is fixedly attached, by stitching, to said outer surface of said hollow and trapezoidal-shaped left side panel, at a substantial midpoint between said pair of parallel and spaced-apart longitudinal sides of said hollow and trapezoidal-shaped left side panel, and in proximity to said slightly skew front side of said hollow and trapezoidal-shaped left side panel.

21. The pet aid as defined in claim 20, wherein said second continuous, light-reflective, and adjustable belly strap extends along, and is fixedly attached by stitching to, said outer surface of said hollow and trapezoidal-shaped left side panel, in proximity to said slightly skew front side of said hollow and trapezoidal-shaped left side panel.

22. The pet aid as defined in claim 21, wherein said second continuous, light-reflective, and adjustable belly strap continues to extend along, and is fixedly attached by stitching to, said outer surface of said hollow and rectangular-shaped too panel, in proximity of, and parallel to, a forwardmost lateral side of said pair of parallel and spaced-apart lateral sides of said hollow and rectangular-shaped top panel.

23. The pet aid as defined in claim 22, wherein said second continuous, light-reflective, and adjustable belly strap continues to extend along, and is fixedly attached by stitching to, said outer surface of said hollow and trapezoidal-shaped right side panel, in proximity of said slightly skew front side of said hollow and trapezoidal-shaped right side panel.

24. The pet aid as defined in claim 23, wherein said second continuous, light-reflective, and adjustable belly strap continues to extend along, and is fixedly attached by stitching to, said outer surface of said trapezoidal-shaped and wide right belly flap, in proximity of said slightly skew front side of said trapezoidal-shaped and wide right belly flap, and which terminates freely past a lowermost longitudinal side of said pair of parallel and spaced-apart longitudinal sides of said trapezoidal-shaped and wide right belly flap as said free distal end of said second continuous, light-reflective, and adjustable belly strap.

25. The pet aid as defined in claim 1, wherein said second strap attaching means includes an easy release buckle female portion that is disposed in a stitched loop formed by said fixed proximal end of said second continuous, light-reflective, and adjustable belly strap; said second strap attaching means further includes an easy release buckle male portion that is adjustably attached to said free distal end of said second continuous, light-reflective, and adjustable belly strap, and which is releasibly engagable with said easy release buckle female portion of said second strap attaching means.

26. The pet aid as defined in claim 1; further comprising a rectangular-shaped logo patch being fixedly attached, by stitching, to said outer surface of said hollow and trapezoidal-shaped left side panel and extending from said second continuous, light-reflective, and adjustable belly strap to said first continuous, light-reflective, and adjustable belly strap, and from said fixed proximal end of said first continuous, light-reflective, and adjustable belly strap and said fixed proximal end of said second continuous, light-reflective, and adjustable belly strap to proximity of a left longitudinal side of said pair of parallel and spaced-apart longitudinal sides of said hollow and rectangular-shaped top panel; said rectangular-shaped logo patch bearing silk-screened indicia thereon being easily readable when said pet flotation aid and walker is donned on the pet.

27. The pet aid as defined in claim 1; further comprising a rectangular-shaped, self-draining, and nylon mesh pocket being expandable at a lower side thereof and being fixedly attached, by stitching on three sides thereof, to said outer surface of said hollow and trapezoidal-shaped right side panel, and extending from said second continuous, light-reflective, and adjustable belly strap to said first continuous, light-reflective, and adjustable belly strap, and from a lowermost longitudinal side of said pair of parallel and spaced-apart longitudinal sides of said hollow and trapezoidal-shaped right side panel to proximity of a right longitudinal side of said pair of parallel and spaced-apart longitudinal sides of said hollow and rectangular-shaped top panel, where said rectangular-shaped, self-draining, and nylon mesh pocket terminates in an open top, so that a light-reflective leash, pet items, and any personal items that are deemed appropriate by said pet owner can be stored therein, if so desired.

28. The pet aid as defined in claim 27; further comprising hook and loop fasteners for selectively opening and closing said open top of said rectangular-shaped, self-draining, and nylon mesh pocket; a portion of said hook and loop fasteners of said rectangular-shaped, self-draining, and nylon mesh pocket being disposed on an inner surface of said open top of said rectangular-shaped, self-draining, and nylon mesh pocket and a mating portion of said hook and loop fasteners being disposed on a corresponding position on said outer surface of said hollow and trapezoidal-shaped right side panel.

29. The pet aid as defined in claim 1; further comprising a continuous and light-reflective grab handle being disposed on said outer surface of said hollow and rectangular-shaped top panel, between, and parallel to, said pair of parallel and spaced-apart longitudinal sides of said hollow and rectangular-shaped top panel, and extending freely from a rearmost lateral side of said pair of parallel and spaced-apart lateral sides of said hollow and rectangular-shaped top panel, where said continuous and light-reflective grab handle is fixedly attached by stitching, to a forwardmost lateral side of said pair of parallel and spaced-apart lateral sides of said hollow and rectangular-shaped top panel, where said continuous and light-reflective grab handle is fixedly attached by stitching, and where said continuous and light-reflective grab handle forms a loop housing a D-shaped leash ring being replaceably engagable by a light-reflective leash, so that a pet owner can safely, quickly and easily raise and lower a pet from a dock to a boat, from the boat to the dock, from the boat to a tender, from the tender to the boat, in and out of a body of water.

30. The pet aid as defined in claim 1; further comprising a hook and loop fastener closable pocket disposed on said outer surface of said generally concavo-convex-shaped right neck flap for holding at least a pet's ID tag.

31. A method of donning a pet flotation aid and walker on a pet, wherein the pet has a back, a right side, a left side, a neck, and a chest, comprising the steps of:

a) placing a hollow and rectangular-shaped top panel containing foam floatation material of said pet flotation aid and walker on the back of the pet, with a hollow and trapezoidal-shaped right side panel containing foam floatation material of said pet flotation aid and walker bending downwardly onto the right side of the pet, with a hollow and trapezoidal-shaped left side panel containing foam floatation material of said pet flotation aid and walker bending downwardly onto the left side of the pet, and with a generally concavo-convex-shaped right neck flap containing foam floatation material of said pet flotation aid and walker and a generally concavo-convex-shaped left neck flap containing foam floatation material of said pet flotation aid and walker extending forwardly;

b) bending a trapezoidal-shaped and wide left belly flap of said pet flotation aid and walker inwardly onto the belly of the pet;

c) bending a trapezoidal-shaped and wide right belly flap of said pet flotation aid and walker inwardly and overlapping said trapezoidal-shaped and wide left belly flap;

d) extending a first continuous, light-reflective, and adjustable belly strap of said pet flotation aid and walker over said trapezoidal-shaped and wide left belly flap;

e) engaging releasibly a properly adjusted first easy release buckle male portion of said first continuous, light-reflective, and adjustable belly strap with a first easy release buckle female portion of said first continuous, light-reflective, and adjustable belly strap, so that a portion of said pet flotation aid and walker is secured around the back of the pet, the right side of the pet, the left side of the pet, and the belly of the pet;

f) extending a second continuous, light-reflective, and adjustable belly strap of said pet flotation aid and walker over said trapezoidal-shaped and wide left belly flap;

g) engaging releasibly a properly adjusted second easy release buckle male portion of said second continuous, light-reflective, and adjustable belly strap with a second easy release buckle female portion of said second continuous, light-reflective, and adjustable belly strap, so that another portion of said pet flotation aid and walker is secured around the back of the pet, the right side of the pet, the left side of the pet, and the belly of the pet;

h) bending said generally concavo-convex-shaped left neck flap inwardly onto the neck of the pet and the chest of the pet;

i) bending said generally concavo-convex-shaped right neck flap inwardly and overlapping said generally concavo-convex-shaped left neck flap;

j) engaging releasibly a hook portion of hook and loop fasteners disposed on an inner surface of said generally concavo-convex-shaped right neck flap with a mating loop portion of said hook and loop fasteners disposed on an outer surface of said generally concavo-convex-shaped left neck flap;

k) extending a continuous and light-reflective long strap of said generally concavo-convex-shaped right neck flap over said generally concavo-convex-shaped left neck flap; and l) engaging releasibly a properly adjusted easy release buckle male portion of said generally concavo-convex-shaped right neck flap with an easy release buckle female portion of said generally concavo-convex-shaped left neck flap, so that said pet flotation aid and walker is now securely donned around the neck of the pet and the chest of the pet and thereby now completely securely donned on the pet.

32. A method of protecting a pet against drowning, wherein the pet has a back, a right side, a left side, a neck, a chest, and a belly, comprising the step of donning on the pet a pet flotation aid and walker which comprises:

a) a hollow and rectangular-shaped top panel being positionable on the back of the pet and having a pair of parallel and spaced-apart longitudinal sides with ends, a pair of parallel and spaced-apart lateral sizes being perpendicular to, and connecting said ends of, said pair of parallel and spaced-apart longitudinal sides of said hollow and rectangular-shaped top panel, and an outer surface;

b) a first piece of internal foam floatation material being contained in, and generally filling, at least a portion of said hollow and rectangular-shaped top panel;

c) a hollow and trapezoidal-shaped right side panel being generally downwardly bendable from said hollow and rectangular-shaped top panel and being positionable on the right side of the pet; said hollow and trapezoidal-shaped right side panel having a pair of parallel and spaced-apart longitudinal sides with rearmost ends and forwardmost ends, a rear lateral side being perpendicular to, and connecting, said rearmost ends of said pair of parallel and spaced-apart longitudinal sides of said hollow and trapezoidal-shaped right side panel, an outer surface, and a slightly skew front side slanting slightly upwardly and forwardly from said forwardmost end of a lowermost longitudinal side of said pair of parallel and spaced-apart longitudinal sides of said hollow and trapezoidal-shaped right side panel to said forwardmost end of an uppermost longitudinal side of said pair of parallel and spaced-apart longitudinal sides of said hollow and trapezoidal-shaped right side panel;

d) a second piece of internal foam floatation material being contained in, and generally filling, at least a portion of said hollow and trapezoidal-shaped right side panel;

e) a trapezoidal-shaped and wide right belly flap being generally inwardly bendable from said hollow and trapezoidal-shaped right side panel and being positionable on the belly of the pet; said trapezoidal-shaped and wide right belly flap having a wide width, a pair of parallel and spaced-apart longitudinal sides with forwardmost ends and rearmost ends, a rear lateral side being perpendicular to, and connecting, said rearmost ends of said pair of parallel and spaced-apart longitudinal sides of said trapezoidal-shaped and wide right belly flap, an outer surface, and a slightly skew front side slanting slightly upwardly and forwardly from said forwardmost end of a lowermost longitudinal side of said pair of parallel and spaced-apart longitudinal sides of said trapezoidal-shaped and wide right belly flap to said forwardmost end of an uppermost longitudinal side of said pair of parallel and spaced-apart longitudinal sides of said trapezoidal-shaped and wide right belly flap;

f) a generally concavo-convex-shaped right neck flap being generally inwardly bendable from said hollow and trapezoidal-shaped right side panel and being positionable on the neck of the pet and the chest of the pet; said generally concavo-convex-shaped right neck flap having a concave-shaped side with a forwardmost end and a rearmost end, a convex-shaped side with a forwardmost end and a rearmost end and being spaced below, and generally parallel to, said concave-shaped side of said generally concavo-convex-shaped right neck flap, a slightly skew rear lateral side connecting said rearmost end of said convex-shaped side of said generally concavo-convex-shaped right neck flap to said rearmost end of said concave-shaped side of said generally concavo-convex-shaped right neck flap, a slightly skew front lateral side connecting said forwardmost end of said convex-shaped side of said generally concavo-convex-shaped right neck flap to said forwardmost end of said concave-shaped side of said generally concavo-convex-shaped right neck flap and being shorter than, and oppositely slanted from, said slightly skew rear lateral side of said generally concavo-convex-shaped right neck flap, an outer surface, and an inner surface;

g) a third piece of internal foam floatation material being contained in, and generally filling, at least a portion of said generally concavo-convex-shaped right neck flap;

h) a hollow and trapezoidal-shaped left side panel being generally downwardly bendable from said hollow and rectangular-shaped top panel and being positionable on the left side of the pet; said hollow and trapezoidal-shaped left side panel having a pair of parallel and spaced-apart longitudinal sides with rearmost ends and forwardmost ends, a rear lateral side being perpendicular to, and connecting, said rearmost ends of said pair of parallel and spaced-apart longitudinal sides of said hollow and trapezoidal-shaped left side panel, an outer surface, and a slightly skew front side slanting slightly upwardly and forwardly from said forwardmost end of a lowermost longitudinal side of said pair of parallel and spaced-apart longitudinal sides of said hollow and trapezoidal-shaped left side panel to said forwardmost end of an uppermost longitudinal side of said pair of parallel and spaced-apart longitudinal sides of said hollow and trapezoidal-shaped left side panel;

i) a fourth piece of internal foam floatation material being contained in, and generally filling, at least a portion of said hollow and trapezoidal-shaped left side panel;

j) a trapezoidal-shaped and wide left belly flap being generally inwardly bendable from said hollow and trapezoidal-shaped left side panel and being positionable on the belly of the pet; said trapezoidal-shaped and wide left belly flap having a wide width, a pair of parallel and spaced-apart longitudinal sides with forwardmost ends and rearmost ends, a rear lateral side being perpendicular to, and connecting said rearmost ends of, said pair of parallel and spaced-apart longitudinal sides of said trapezoidal-shaped and wide left belly flap, an outer surface, and a slightly skew front side slanting slightly upwardly and forwardly from said forwardmost end of a lowermost longitudinal side of said pair of parallel and spaced-apart longitudinal sides of said trapezoidal-shaped and wide left belly flap to said forwardmost end of an uppermost longitudinal side of said pair of parallel and spaced-apart longitudinal sides of said trapezoidal-shaped and wide left belly flap;

k) a generally concavo-convex-shaped left neck flap being generally inwardly bendable from said hollow and trapezoidal-shaped left side panel and being positionable on the neck of the pet and the chest of the pet; said generally concavo-convex-shaped left neck flap having a concave-shaped side with a forwardmost end and a rearmost end, a convex-shaped side with a forwardmost end and a rearmost end and being spaced below, and generally parallel to, said concave-shaped side of said generally concavo-convex-shaped left neck flap, a slightly skew rear lateral side connecting said rearmost end of said convex-shaped side of said generally concavo-convex-shaped left neck flap to said rearmost end of said concave-shaped side of said generally concavo-convex-shaped left neck flap, a slightly skew front lateral side connecting said forwardmost end of said convex-shaped side of said generally concavo-convex-shaped left neck flap to said forwardmost end of said concave-shaped side of said generally concavo-convex-shaped left neck flap and being shorter than, and oppositely slanted from, said slightly skew rear lateral side of said generally concavo-convex-shaped left neck flap, an outer surface, and a inner surface; said generally concavo-convex-shaped left neck flap being separate and detachable from said generally concavo-convex-shaped right neck flap, so that said pet flotation aid and walker can be easily removed from the chest of said pet without having to lift the pet, especially when the pet is large;

l) a fifth piece of internal foam floatation material being contained in, and generally filling, at least a portion of said generally concavo-convex-shaped left neck flap;

m) neck flap attaching means for releasibly attaching said generally concavo-convex-shaped right neck flap and said generally concavo-convex-shaped left neck flap to each other when said generally concavo-convex-shaped right neck flap and said generally concavo-convex-shaped left neck flap are positioned on the neck of the pet and the chest of the pet, so that said pet floatation aid and walker is releasibly secured around the neck of the pet and the chest of the pet;

n) a first continuous, light-reflective, and adjustable belly strap having a fixed proximal end and a free distal end and extending across said hollow and trapezoidal-shaped left side panel, said hollow and rectangular-shaped top panel, said hollow and trapezoidal-shaped right side panel, said trapezoidal-shaped and wide right belly flap, and being extendable across said trapezoidal-shaped and wide left belly flap;

o) first strap attaching means for releasibly attaching said fixed proximal end of said first continuous, light-reflective, and adjustable belly strap to said free distal end of said first continuous, light-reflective, and adjustable belly strap, so that another portion of said pet floatation aid and walker is releasibly secured around the back of the pet, the right side of the pet, the left side of the pet, and the belly of the pet;

p) a second continuous, light-reflective, and adjustable belly strap having a fixed proximal end and a free distal end and extending across said hollow and trapezoidal-shaped left side panel, said hollow and rectangular-shaped top panel, said hollow and trapezoidal-shaped right side panel, said trapezoidal-shaped and wide right belly flap, and being extendable across said trapezoidal-shaped wide and left belly flap; and q) second strap attaching means for releasibly attaching said fixed proximal end of said second continuous, light-reflective, and adjustable belly strap to said free distal end of said second continuous, light-reflective, and adjustable belly strap, so that a remaining portion of said pet floatation aid and walker is releasibly secured around the back of the pet, the right side of the pet, the left side of the pet, and the belly of the pet and thereby said pet floatation aid and walker is completely releasibly secured on the pet and can removed from the pet extremely quickly without bother, by simply unfastening said neck flap attaching means, said first strap attaching means, and said second strap attaching means.

* * * * *